United States Patent
Takeda et al.

Patent Number: 6,018,507
Date of Patent: Jan. 25, 2000

[54] METHOD OF AND APPARATUS FOR RECORDING DATA ON LAND/GROOVE TRACK ON OPTICAL RECORDING MEDIUM

[75] Inventors: Toru Takeda, Saitama; Akira Shimazu; Tamotsu Yamagami, both of Kanagawa; Tadaaki Nomoto, Tokyo, all of Japan

[73] Assignee: Sony Corporation, Tokyo, Japan

[21] Appl. No.: 08/935,400

[22] Filed: Sep. 23, 1997

[30] Foreign Application Priority Data

Sep. 24, 1996 [JP] Japan ................................ 8-251942

[51] Int. Cl.[7] ........................................... G11B 7/00
[52] U.S. Cl. ................. 369/111; 369/275.2; 369/275.4; 369/44.29; 369/100
[58] Field of Search ................. 369/44.26, 111, 369/100, 121, 275.1, 275.2, 275.3, 275.4, 109, 44.29

[56] References Cited

U.S. PATENT DOCUMENTS

| | | | |
|---|---|---|---|
| 4,788,685 | 11/1988 | Sako et al. | 371/38 |
| 5,216,656 | 6/1993 | Sako et al. | 369/59 |
| 5,272,684 | 12/1993 | Takeuchi et al. | 369/13 |
| 5,483,508 | 1/1996 | Miyake et al. | 369/111 |
| 5,617,388 | 4/1997 | Ishioka et al. | 369/44.28 |
| 5,815,486 | 9/1998 | Kobayashi et al. | 369/275.4 |

FOREIGN PATENT DOCUMENTS

0565751 A1  10/1992  European Pat. Off. ........ G11B 11/10

OTHER PUBLICATIONS

Patent Abstracts of Japan, JP 3-263637 Published Nov. 25, 1991, Fujitsu Ltd.
Patent Abstracts of Japan, JP 4-162234 Published Jun. 5, 1992, Olympus Optical Co. Ltd.

*Primary Examiner*—Thang V. Tran
*Attorney, Agent, or Firm*—Limbach & Limbach LLP

[57] ABSTRACT

An optical recording method according to the invention is provided such, that when an optical pickup (2) is moved over an optical disk (1), the optical pickup (2) being positioned onto the target track location, record marks are recorded on the optical disk (1) by a light beam irradiated onto the optical disk (1) through the optical pickup (2). An irradiation position of the light beam is offset during recording by a predetermined amount to a track at the recording direction side relative to the target track location, and a record mark is formed on a target track by the offset light beam.

43 Claims, 13 Drawing Sheets

PRIOR ART

Amorphous State

Crystalline State

FIG. 8B  Before Overwriting
FIG. 8C  After Overwriting

METHOD OF AND APPARATUS FOR RECORDING DATA ON LAND/GROOVE TRACK ON OPTICAL RECORDING MEDIUM

BACKGROUND OF THE INVENTION

1. Field of the Invention

The present invention relates to an optical recording method of and an optical recording apparatus for use in recording data, for example, in a digital video disk (DVD) using a light beam.

2. Description of the Related Art

With the development of multimedia pointing to a high information-oriented society, a still higher performance and a still greater capacity of the optical disk are demanded. Seeing from the function and the purpose, the optical disk is roughly classified into three kinds, namely, the optical disk for read only operation in which information data recorded during the disk-cutting are only reproduced, the optical disk for write once operation in which data can be recorded once but the data cannot be rewritten, and the rewritable optical disk in which data can be rewritten repeatedly.

Of these disks, in particular, for the rewritable optical disk in which information data can be rewritten, greater capacity is demanded and so, using only a groove recording method in which information data are recorded only on a groove portion which comprises a spiral groove formed on the optical disk surface, it is impossible to satisfy the needed recording capacity. Thus, in the rewritable optical disk, a land-groove recording method in which information data are recorded on the groove portion as well as a portion called the land portion between the groove portions has been adopted.

In an optical disk recording/reproducing apparatus, in order to record information data on a target track of the optical disk, an optical pickup must be moved onto a target track of the optical disk and then the laser beam must be irradiated onto the target track. To this end, it is necessary to position the optical pickup to the target location. As a servo system which moves the optical pickup to the target location in the radial direction of the optical disk, there is a tracking servo system.

The tracking servo system is comprised of a tracking coil of an actuator system in the optical pickup and a tracking servo circuit. The actuator system makes the optical pickup to perform fine tracking operation, for example, by a two axes actuator.

When the laser beam chases the track for tracking to read an address and a difference from a target address is known, a fine seeking by that difference is performed. At this time, if an eccentric velocity is large, it is difficult to perform a stable seeking control. Accordingly, after waiting until the eccentric velocity becomes small, it finally reaches the target track and then performs a recording operation by the land-groove recording method in which information data are recorded on the groove portion as well as the land portion between the groove portions of the optical disk.

However, as the rewritable optical disk is made to have a large capacity, it is required that a track pitch is constructed as narrow as possible. Consequently, a diameter of the laser beam of the optical pickup has come to cover not only the groove portion which is the target for positioning the track but also the already recorded land portion adjacent to the side of the internal circumference of the disk and a non-recorded land portion on the side of the external circumference of the disk.

As a result, when information data is recorded on the groove portion, a cross-erasing is caused, in which information data of the already recorded land portion adjacent to the groove portion that is the target for positioning, on the side of the external circumference of the disk are erased.

FIG. 1 shows a specific operation according to a conventional land-groove recording method.

Referring to FIG. 1, toward the external circumference side of the disk are arranged a land L1, a groove G1, a land L2 and a groove G2. The recording operation will proceed in the direction from the land L1 to the groove G1, the land L2 and the groove G2.

Referring to FIG. 1, record marks 130 and 131 are formed first on the land L1 on the side of the internal circumference of the disk in the direction of rotation of the disk by the laser beam. Next, new record marks 132 and 133 are formed on the groove G1 adjacent to the side of the external circumference of the land L1 by the laser beam overwriting. At this time, while the record marks 130 and 131 are formed on the land L1 before the overwriting operation, the diameter of a laser beam spot 134 is larger than a track width d being each width of the land L1 and the groove G1, and besides, the laser spot is made to track a center of the width of each of the land L1 and the groove G1, so that they are recorded beyond the groove G1 sticking out into the internal circumference side and the external circumference side of the disk. In this condition, the new record marks 132 and 133 are formed on the groove G1 after the overwriting operation on the groove G1.

Firstly, as shown in the groove G1, the new record mark 132 is formed on the groove G1 after overwriting. At this time, as shown in the groove G1, there exists the record mark 130 formed by the laser beam on the land L1 and the groove G1 before the overwriting operation. In this case, by forming the new record mark 132 on the groove G1, the laser beam overwrites a portion of the record mark 130, which is indicated by a broken line, sticking out into the land L1 and cross-erases a remaining portion of the record mark 130, which is indicated by the broken line in the record mark 130, sticking out into the land L1. In this way, by forming the new record mark 132, on the groove G1 the record mark 130 in the land L1 is overwritten and at the same time cross-erased. Therefore, the record mark 130 is not formed in the full track width d of the land L1, but formed in an effective record width b narrowed by an erase width c.

Likewise, as shown subsequently in the direction of rotation of the disk in the groove G1, the new record mark 133 is formed on the groove G1 after the overwriting. At this time, as shown in the groove G1 there exists the record mark 131 formed by the laser beam on the land L1 and the groove G1 before the overwriting operation. Here, by forming the new record mark 133 on the groove G1, a portion of the record mark 131, in the land L which is indicated by the broken line, is overwritten by the laser beam sticking out into the land L1, and a remaining portion of the record mark 131, which is indicated by the broken line in that mark 131 is cross-erased by the laser beam sticking out into the land L1. In this manner, by forming the new record mark 133 on the groove G1, the record mark 131 on the land L1 is overwritten as well as cross-erased. Therefore, the record mark 131 is not formed in the full track width d of the land L1, but formed in an effective record width b narrowed by an erase width c.

Likewise, as shown in the land L2, a new record mark 135 is formed on the land L2 after the overwriting. At this time, as shown in the land L2 there exists the record mark 132 formed by the laser beam on the groove G1 and land L2 before the overwriting operation. Here, by forming the new record mark 135 in the land L2, a portion of the record mark 132, which is indicated by the broken line is cross-erased by the laser beam sticking out into the land L2, and a remaining portion of the record mark 133, which is indicated by the broken line in the groove G1, is cross-erased by the laser beam sticking out into the land L2. Further, by forming a new record mark 136 in the land L2, a portion of subsequent record mark 133, which is indicated by the broken line in the groove G1, is overwritten by the laser beam sticking out into the land L2.

In this manner, by forming the new record mark 135 in the land L2, the record marks 132, 133 on the groove G1 are cross-erased and by forming the new record mark 136 in the land L2, the record mark 133 on the groove G1 is overwritten. Therefore, the record marks 132 and 133 are not formed in the full track width d of the groove G1, but formed in an effective record width b narrowed by the erase width c.

FIG. 2 shows a recorded state of the record mark by the conventional land-groove recording method. As is shown in FIG. 2, when a record mark 140 is formed on the land L1, the record mark 140 is formed sticking out into the adjacent groove G1 in the external circumference side of the disk. Moreover, when a new record mark is formed on the groove G1, a portion of the record mark 140, which is indicated by the broken line, already recorded on the land L1 will be overwritten or cross-erased.

Essentially, if information data are recorded by forming the record marks in the proper area of the groove portion and the land portion, namely in the full track width d in the track width direction, it would be possible to improve the S/N ratio by reproducing all the recorded data as reproduced data during reproduction.

However, if the cross-erasing of information data in adjacent tracks is caused in this manner, it is impossible to reproduce all the recorded data during reproduction. Accordingly, a level of reproduced signals is lowered or a noise is introduced into the reproduced data. Under the worst conditions, it may sometimes be impossible to obtain any reproduced data.

In this way, with the conventional optical recording method cross-erasing has been caused, in which information data recorded on the land portion adjacent to the groove portion to be recorded are erroneously erased. However, since no counter measure against the cross-erasing has been considered, there exists a disadvantage in which not all of the recorded data are kept in the recorded state or noise is introduced into the reproduced data or no reproduced data can be obtained.

In particular, with a land-groove recording and reproducing method which is expected as a recording method enabling a high density recording, if the width of the land portion and the groove portion in the track direction is made narrower than a diameter of the laser spot, then cross-erasing becomes a serious problem when recording data.

SUMMARY OF THE INVENTION

In view of such aspects, it is an object of the present invention to provide a method of optical recording able to eliminate the influence of the cross-erasing during recording.

According to a first aspect of the present invention, an optical recording method of moving an optical pickup over a recording medium to position the optical pickup onto a target track, and forming a record mark on the recording medium by a light beam irradiated onto the optical disk from the optical pickup, includes the step of offsetting a position on the recording medium of the light beam by a predetermined length relative to the target track in the direction of the recording, and the step of forming a record mark on the target track by the offset light beam.

According to a second aspect of the present invention, an apparatus for recording data on an optical disk having a groove portion and a land portion which are alternately disposed in the radius direction, includes an optical pickup for irradiating a light beam on a recording surface of the optical disk so that a light spot larger than both widths of the groove portion and the land portion should be formed thereon, tracking means for controlling a position of the light spot relative to the track, tracking setting means for controlling the tracking means so that a center of the light spot should be located at a position offset by a predetermined amount relative to track centers of the groove portion and the land portion, and output controlling means for forming a record mark on the recording surface of the optical disk by controlling a power of the light beam.

An operation according to the optical recording method of the present invention is as follows.

The present invention is utilized for a sequential recording which records the record marks successively on the recording medium. Moreover, the present invention is applicable not only to continuous recording but also to a random recording which records a data group on a desired area of a disk, the data group being such that they are continuously recorded with a certain degree of track width.

An optical output of the light beam of the optical pickup has three steps of levels, namely, a write power which is a high level output and enables the writing operation, an erase power which is a middle level output and enables the erasing operation, and a read power which is a low level output and enables the reading operation. Further, the tracks are arranged continuously in the direction toward the external circumference of the recording medium and the recording operation will proceed along the tracks continuously arranged in the direction toward the external circumference of the recording medium.

To begin with, a first record mark is formed by the light beam on a first track on the side of the internal circumference of the recording medium in the direction of rotation of the recording medium. Next, a new second record mark is formed on a second track adjacent to the first track on the external circumference side of the recording medium by the light beam overwriting. In this case, the first record mark has been formed before the overwriting. However, since the diameter of the light beam spot is larger than a width of the first track, the first record mark has been recorded sticking out into the second track on the external circumference side of the recording medium. An operation to form the new second record mark on the second track after the overwriting operation in the second track under this condition will be described.

Firstly, for the writing operation, the optical output of the light beam becomes an optical pulse which is pulse width modulated between the write power which is the high level output enabling the write operation and the erase power which is the middle level output enabling the erasing operation. Hereby, the second track goes into the amorphous state after the overwriting and so the new second record mark is formed on the second track. In this case, a portion of the first record mark formed by the light beam on the first track before the overwriting in the second track sticks out onto the second track. The portion which sticks out into the second track goes into the overwritten state because that portion changes into the amorphous state after overwriting by the pulse width modulated optical pulse. In this way, on the second track in which the second record mark is formed, the track is made to change into the amorphous state, that is, into the overwritten state.

Next, as shown on the second track in the direction of rotation of the recording medium, the optical output of the light beam becomes the erase power enabling the erasing operation with the middle level output. At this time, as already shown the first record mark formed on the first track by the light beam, sticks out into the second track before the overwriting operation. Since the portion which sticks into the second track changes into a crystalline state after overwriting by the erase power, it goes into the erased state. In this manner, the second track portion where the second mark is not formed is made to change into the crystalline state, that is, into the erased state. In the same way as above, new record marks can successively be formed up to the track in the external circumference of the recording medium.

In this way, the light beam is offset by a detrack-offset amount to a track side in the direction of recording by a target value setting/altering means so that an edge of the diameter of the light beam spot in the direction toward the internal circumference of the recording medium may coincide with an edge of the first track or the second track in the direction toward the internal circumference of the recording medium. Accordingly, a portion which sticks out into the track on the side of the external circumference of the recording medium will be subjected to the erasing operation and erased thereby, or overwritten by the overwriting operation to form the record mark on the stuck portion, thereby allowing the first record mark and the second record mark to be formed in the effective track width of the first track or the second track.

By recording the record marks in this manner, the record mark within the effective track width of the adjacent track on the side of the internal circumference of the recording medium will never be erased, thereby enabling the cross-erasing problem to be solved.

Furthermore, even if the effective track width may be made smaller against the diameter of the light beam spot, it is possible to erase the record mark by the erasing operation or to form the record mark by the overwriting operation, without causing cross-erasing.

BRIEF DESCRIPTION OF THE DRAWINGS

FIGS. 5A and 5B are diagrams showing tracking by a push-pull method according to the present invention, wherein FIG. 5A shows the land and the groove of the optical disk and FIG. 5B shows the tracking error signal;

FIGS. 7A and 7B are diagrams showing the principle of phase change recording according to the present invention, wherein FIG. 7A shows the amorphous state and FIG. 7B shows the crystalline state;

FIGS. 8A to 8C are diagrams showing overwriting in the phase change recording according to the present invention, wherein FIG. 8A shows the laser power, FIG. 8B shows the land and the groove before overwriting and FIG. 8C shows the land and the groove after overwriting;

FIGS. 10A and 10B are diagrams showing a double spiral groove according to the present invention, wherein FIG. 10A shows the formation of the double spiral groove and FIG. 10B shows track location information;

FIGS. 11A and 11B are diagrams showing a single spiral groove according to the present invention, wherein FIG. 11A shows the formation of the single spiral groove and FIG. 11B shows the track location information;

DESCRIPTION OF THE PREFERRED EMBODIMENT

An embodiment according to the present invention will be described below. An optical disk to which the present embodiment is applied is a digital video disk (DVD). In DVD, there are a number of families, namely, a DVD-ROM for reproduction only, a DVD-R in which information can be written once, and a DVD-RAM which is rewritable repeatedly.

The present embodiment is applicable to the rewritable DVD-RAM of these DVD. An outline of DVD-RAM will be described. Concerning a thin film for recording, a phase change type of film is used, which enables phase change recording wherein recording/erasing of information is performed by causing a crystalline phase change in the structure with a temperature rise due to the heat of light beam irradiation, and reproduction of information is performed by detecting a change of reflectance arising from a change of an optical constant between the phases. The optical disk has a diameter of 120 [mm], a thickness of 0.6 [mm] and a recording capacity of 2.6 [G byte] for one side and 5.2 G byte for both sides. The track pitch of the optical disk is 0.74 [$\mu$m] and the sector size thereof is 2 [k byte]. Also, the numerical aperture NA of an objective lens of the optical pickup used is 0.6 and the laser wavelength is 650 or 680 [nm]. The modulation type and the error correction code ECC used are 8/16 modulation and Reed Solomon product code, respectively. The transfer data rate used is more than 10 [M bit/s].

Figure 1:
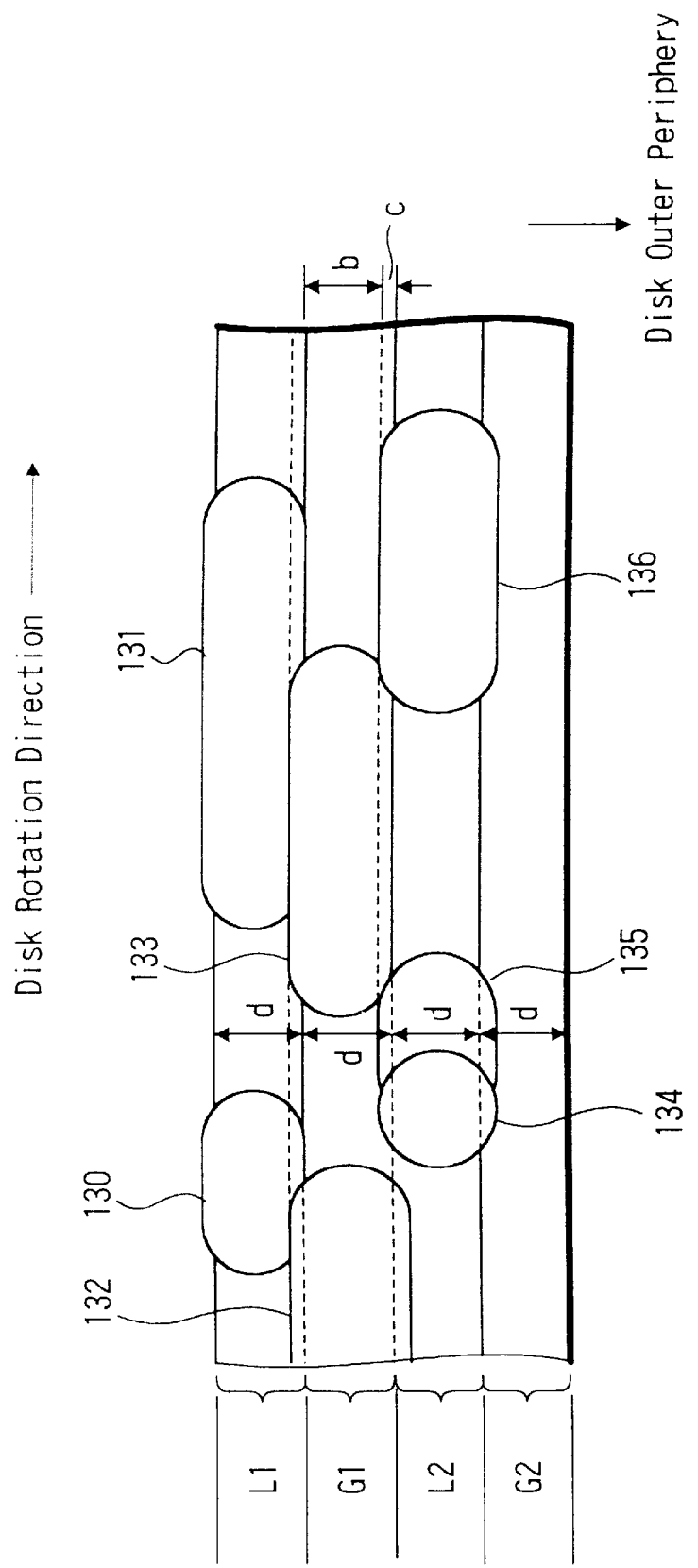
FIG. 1 is a diagram showing a land-groove recording method.
Figure 2:
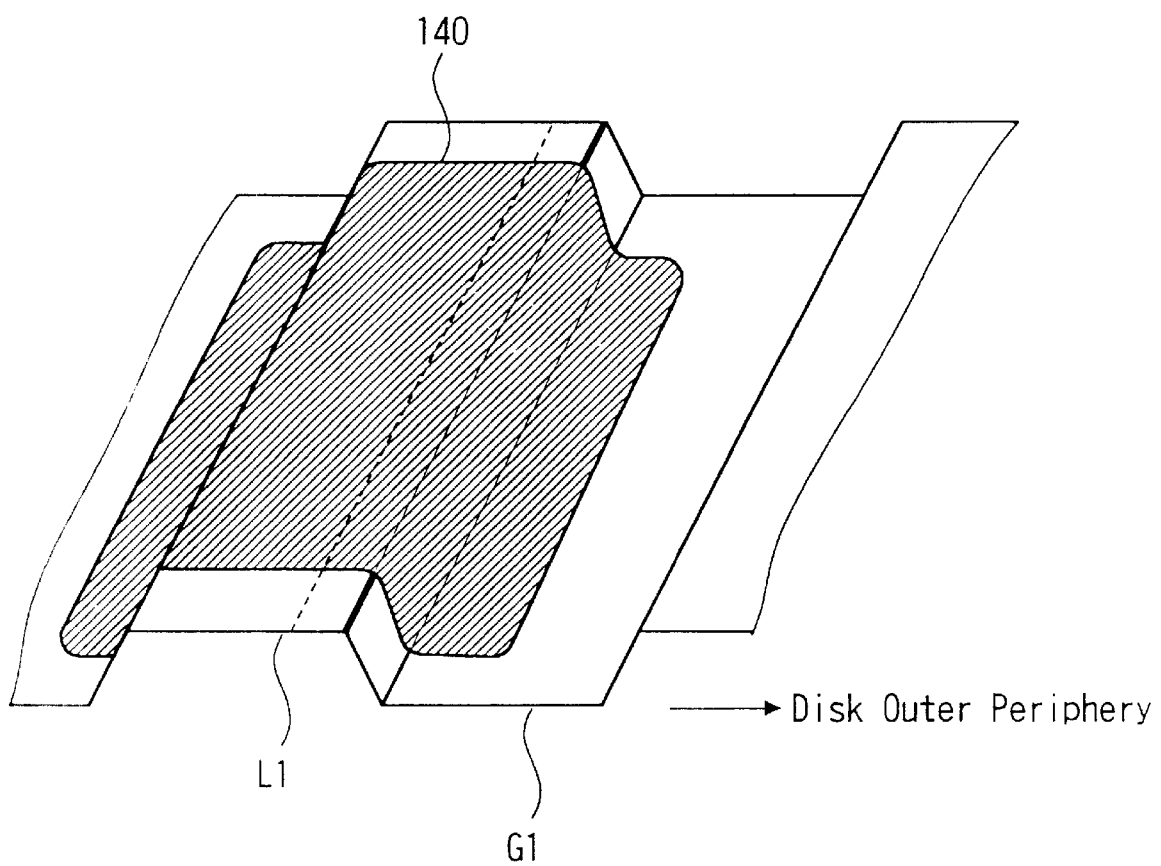
FIG. 2 is a diagram showing the recorded condition of the record mark by the land-groove recording method.
Figure 3:
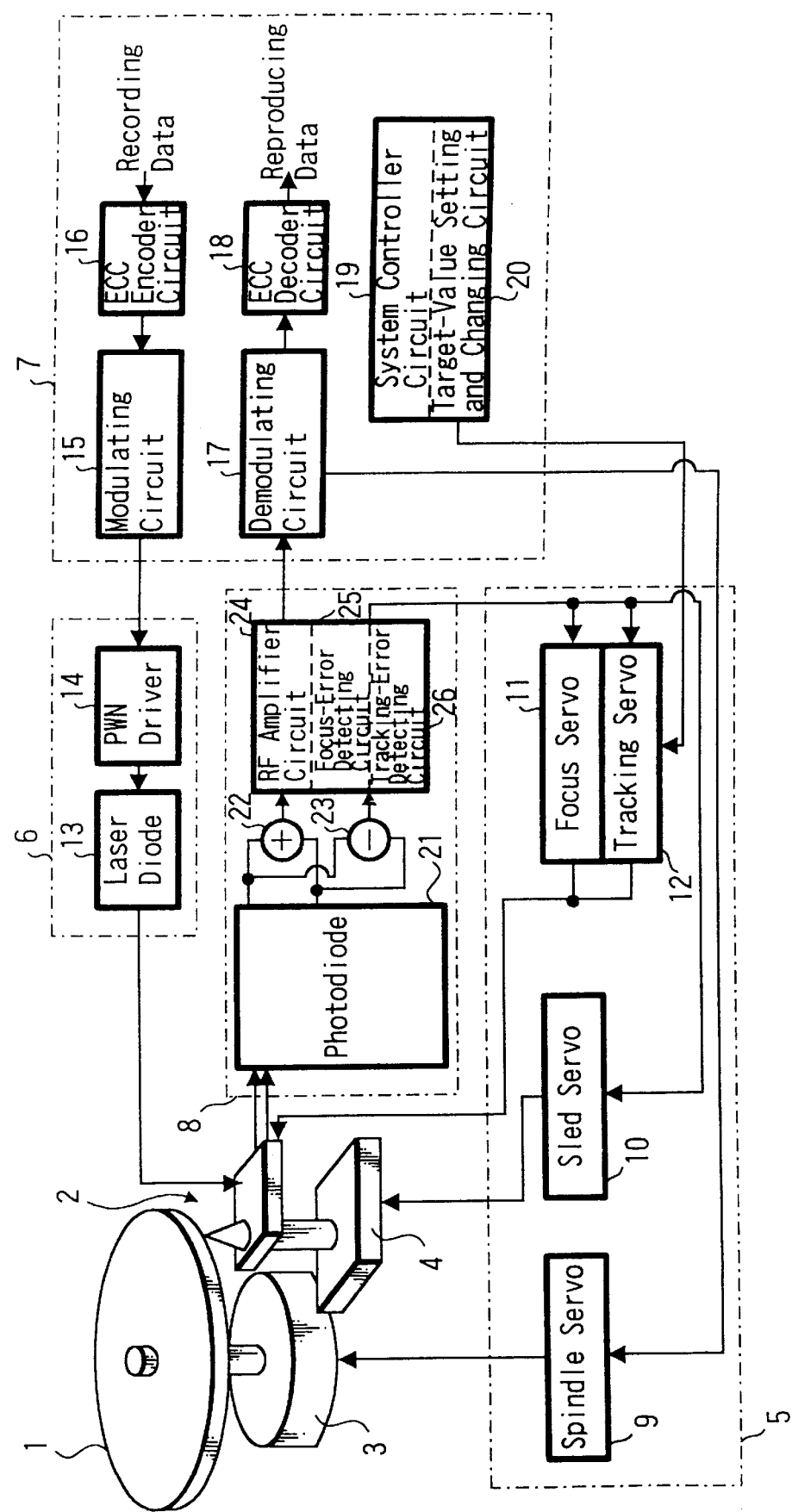
FIG. 3 is a block diagram showing the construction of an optical disk recording/reproducing apparatus according to the present invention.

Next, a construction of the present embodiment applied to the aforesaid optical disk will be illustrated. FIG. 3 is a block diagram showing the construction of an optical disk recording/reproducing apparatus according to the present embodiment.

First of all, the construction of the optical disk recording/reproducing apparatus will be described. The optical disk recording/reproducing apparatus according to the present embodiment comprises an optical disk rotation drive control system, a rough forwarding drive control system, a servo control circuit 5 which controls respective servo systems of the optical pickup control system, a laser control circuit 6 which controls the laser power supplied to an optical pickup 2, an I-V converting matrix circuit 8 which derives a reproduced RF signal, a focus error signal and a tracking error signal from reflected light of the laser, and a signal control circuit 7.

The optical disk rotation drive control system includes a spindle servo circuit 9, a spindle motor 3 and an optical disk 1. Here, the optical disk 1 forms the recording medium. The coarse forwarding drive control system includes a sled servo circuit 10 and a slide motor 4. The optical pickup control system includes the optical pickup 2, the I-V converting matrix circuit 8, a focusing servo circuit 11, a tracking servo circuit 12 and the laser control circuit 6. Here, the I-V converting matrix circuit 8 includes a photodetector 21 for detecting the reflected light of the laser with two divided planes, an adder 22 for adding two divided signals, a subtractor 23 for subtracting one of the two divided signals from the other, an RF amplifier circuit 24 for amplifying the reproduced RF signal from an output of the adder 2 and supplying a servo signal to a sled servo circuit 10, a focusing error detector circuit 25 for detecting a focusing error from an output of the subtractor 23, and a tracking error detector circuit 26 for detecting a tracking error signal output from the subtractor 23. Furthermore, the laser control circuit 6 includes a PWM driver 14 for pulse width modulating the laser light and a laser diode 13 for emitting the laser light.

The signal control circuit 7 includes a system control circuit 19 for controlling various parts of the apparatus, an ECC encoder circuit 16 for adding the error correction code by the Reed Solomon code to data to be recorded, a modulator circuit 15 for 8/16 modulating the data to be recorded to which the error correction code is added, a demodulator circuit 17 for 8/16 demodulating reproduced data and supplying a servo signal to the spindle servo circuit 9, and an ECC decoder circuit 18 for error correction processing the reproduced data by the Reed Solomon code to output the resulting reproduced data. Here, in this embodiment, the system control circuit 19 particularly includes a target value setting and changing circuit 20 for offsetting the target value of the tracking servo from an ontrack state to a detrack state against the tracking servo circuit 12.

Next, the connective relation of the optical disk recording/reproducing apparatus will be stated. Firstly, the connective relation of the optical disk rotation drive control system will be described. The spindle servo circuit 9 is connected to the spindle motor 3 and this spindle motor 3 is connected to the optical disk 1 through a rotating mechanism.

Next, the connective relation of the coarse forwarding drive control system will be described. The sled servo circuit 10 is connected to the sled motor 4 and this sled motor 4 is connected to the optical pickup 2 of the optical pickup control system through the coarse forwarding mechanism.

Next, the connective relation of the optical pickup control system will be described. The optical pickup 2 has the photodiode 21 of the I-V converting matrix circuit 8 and the two divided outputs of the photodiode 21 are connected to the adder 22 and the subtractor 23, respectively. The adder 22 and the subtractor 23 are connected to the RF amplifier circuit 24 and at the same time to the focusing error detector circuit 25 and the tracking error detector circuit 26.

Also, the focusing error detector circuit 25 and the tracking error detector circuit 26 are connected to the focusing servo circuit 11 and the tracking servo circuit 12, and the focusing servo circuit 11 and the tracking servo circuit 12 are connected to a focusing coil and a tracking coil, though not shown, of the optical pickup 2, respectively.

Next, the connective relation of the signal processing system will be described. The RF amplifier circuit 24 is connected to the demodulator circuit 17 of the signal control circuit 7 and the demodulator circuit 17 is connected to the ECC decoder circuit 18. Also, the ECC encoder circuit 16 is connected to the modulator circuit 15 and this modulator circuit 15 is connected to the PWM driver 14 of the laser control circuit 6. The PWM driver 14 is connected to the laser diode 13 and this laser diode 13 makes the optical pickup 2 to form a predetermined laser beam.

Here, in this embodiment, the target value setting and changing circuit 20 of the system control circuit 19 is particularly connected to the tracking servo circuit 12 and has a function to enable the target value of the tracking servo to be offset from the ontrack state to the detrack state.

The optical disk recording/reproducing apparatus is further connected to a host computer through the system control circuit 19 and an interface circuit not shown.

Now, an operation of the optical disk recording/reproducing apparatus constructed in this manner will be described. When information signals are recorded or reproduced by the optical disk recording/reproducing apparatus according to commands from the host computer not shown, the optical pickup 2 is positioned onto the target track location on the optical disk 1 by making the sled motor 4 to perform the seeking operation through the host computer, and then the tracking coil and the focusing coil are driven by the tracking servo circuit 12 and the focusing servo circuit 11 to make the tracking and focusing to coincide with the target value by fine adjustment.

In recording, the laser power is beforehand set to be on the erase power level by the laser control circuit 6 for erasing information parts which are not to be recorded and then the laser power is adjusted to the write power level for recording an information signal on the target track location. In reproducing, the laser power is adjusted to the read power level by the laser control circuit 6 for reproducing the information signal recorded on the target track location.

In the signal control system, the system control circuit 19 supplies first a command of rotation to the spindle servo circuit 9 of the servo control circuit 5 according to the host computer. The spindle servo circuit 9 supplies a driving signal to the spindle motor 3 by this command for causing the spindle motor 3 to rotate. A servo signal synchronously detected by the demodulator circuit 17 from the reproduced RF signal is supplied to the spindle servo circuit 9.

Next, the system control circuit 19 supplies a command of the coarse forwarding to the sled servo circuit 10 according to the host computer. The optical pickup 2 reads the information signal of the current position from the optical disk 1 and supplies the RF signal, an added signal and a subtracted signal to the RF amplifier circuit 24, the focusing error detector circuit 25 and the tracking error detector circuit 26 through the photodiode 21, the adder 22 and the subtractor 23. The tracking error detector circuit 26 generates from the difference signal a tracking error signal which is supplied to the sled servo circuit 10. The sled servo circuit 10 generates a driving signal based on the tracking error signal and supplies the driving signal to the sled motor 4. The sled motor 4 makes the optical pickup 2 to perform a rough seeking operation based on the driving signal through the coarse forwarding mechanism not shown.

The operation of the seek servo system is comprised of two operations of the sled motor system and an actuator system inside the optical pickup 2. The sled motor system causes the optical pickup 2 to perform the rough seeking operation by means of the slide motor 4 and detects the location by an encoder not shown for positioning. The actuator system causes the optical pickup 2 to perform a fine seeking operation by a two axes actuator using the tracking coil not shown.

The operation sequence of such a seek servo system will be described below. Firstly, the rough seeking operation is performed to the vicinity of the target track position. Even if the optical pickup 2 stops at the vicinity of the target address as a result of the rough seeking, a moving part of the actuator inside the optical pickup 2 will not stop immediately but vibrate for a predetermined time of settlement until it stops.

Next, a track pulling operation is performed for reading address information which has been reached. Here, since the performance of the track pulling operation at a time point when a track eccentric velocity is large tends to cause a pulling error, this operation is set to be waited until the eccentric velocity approaches zero.

And then, the laser beam pursues the track and the tracking coil is driven by the driving signal from the tracking servo circuit 12 for the ontrack tracking. When the address is read out and the difference from the target address is known, the fine seeking is performed by that difference. At this time, the optical pickup 2 reads the information signal of the current position from the optical disk 1 and supplies that signal to the tracking error detector circuit 26.

Particularly, the photo diode 21 receives the laser light reflected by the optical disk 1 on the two divided planes. The photo diode 21 converts the two divided laser lights received into electric signals which are supplied to the subtractor 23. The subtractor 23 generates the difference signal by subtracting one of the two divided signals from the other. The tracking error detector circuit 26 detects from that difference signal the tracking error signal which is supplied to the tracking servo circuit 12. The tracking servo circuit 12 performs the tracking of the optical pickup 2 based on the tracking error signal by means of the tracking coil of the two axes actuator not shown. Also, the focusing error detector circuit 25 detects from another difference signal from the subtractor 23 the focusing error signal which is supplied to the focusing servo circuit 11. The focusing servo circuit 11 performs the focusing of the optical pickup 2 based on the focusing error signal by means of the focusing coil of the two axes actuator not shown.

After the optical pickup 2 is positioned onto the target track location, the operation of recording or reproducing will be performed as follows. In reproduction, the system control circuit 19 supplies a command of reproduction to the PWM driver 14 of the laser control circuit 6. The PWM driver 14 adjusts the laser light emitting power to be on the reproducing power level and supplies it to the laser diode 13. The laser diode 13 irradiates the laser light onto the optical disk 1 through a lens. The photo diode 21 receives the laser light reflected by the optical disk 1 on the two divided planes. The photo diode 21 converts the two divided laser lights received into the electric signals which are supplied to the adder 22. The adder 22 adds the two divided signals for generating the reproduced RF signal.

The reproduced RF signal is supplied to the RF amplifier circuit 24. The RF amplifier circuit 24 high frequency amplifies the reproduced data and supplies the resulting data to the demodulator circuit 17. The demodulator circuit 17 8/16 demodulates the reproduced data. The demodulator circuit 17 supplies the demodulated data to the ECC decoder circuit 18. The ECC decoder circuit 18 applies the error correction processing to the reproduced data by Reed Solomon code for outputting the resulting reproduced data. The decoded information signal is supplied to the host computer.

In recording, the system control circuit 19 supplies a command of recording to the PWM driver 14 of the laser control circuit 6. Data to be recorded which is supplied from the host computer is passed to the ECC encoder circuit 16. The ECC encoder circuit 16 adds an error correction code to the data to be recorded by the Reed Solomon code. The ECC encoder circuit 16 supplies the data to be recorded to which the error correction code has been added to the modulator circuit 15. The modulator circuit 15 8/16 modulates the data to be recorded to which the error correction code has been added. The modulator circuit 15 supplies the modulated data to be recorded to the PWM driver 14 of the laser control circuit 6. The PWM driver 14 pulse width modulates the data to be recorded which is 8/16 modulated based on the record command, and supplies the laser light emitting signal on the write power level to the laser diode 13. The laser diode 13 irradiates the laser light onto the optical disk 1 through the lens inside the optical pickup 2. The recording thin film of the optical disk 1 is heated into the amorphous state by the laser light and the data to be recorded are recorded on the target track location.

In the present embodiment, when the tracking servo is performed especially in recording, the optical pickup is positioned by the target value setting and changing circuit 20 so that a laser beam should be detrack-offset by predetermined value in the direction of recording rather than that it should be ontrack on the target track location, in which condition the data to be recorded will be formed continuously on a predetermined track portion. When the tracking servo is performed in reproduction, the recorded data is reproduced in a condition that the optical pickup is positioned so that the laser beam be ontrack on the target track location.

Figure 4:
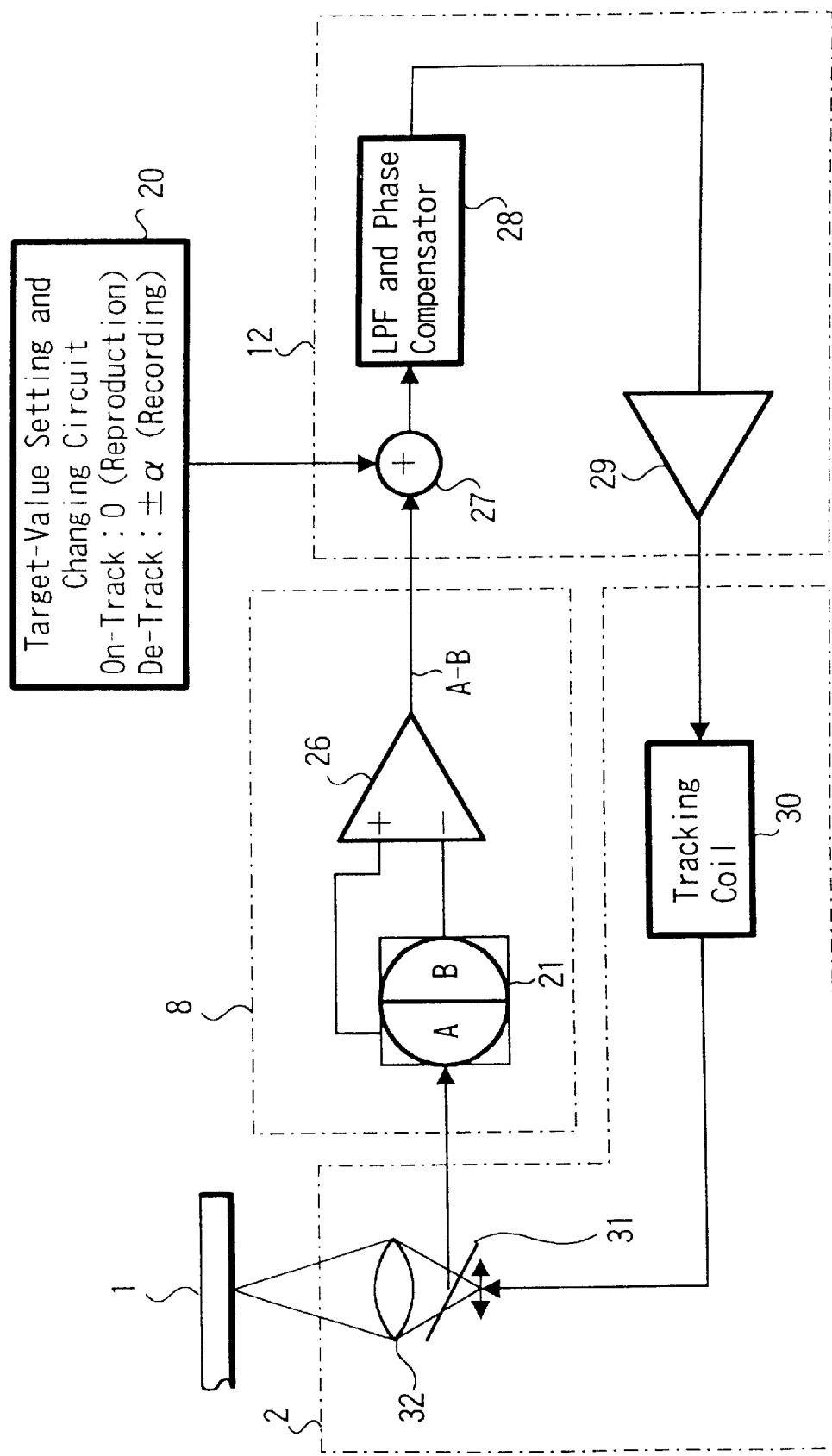
FIG. 4 is a block diagram showing the construction of a tracking servo system according to the present invention.

A construction of the tracking servo system according to the present embodiment of the optical disk recording/reproducing apparatus which is constructed and operates in this manner will be described with reference to FIG. 4. As shown in FIG. 4, this tracking servo system includes the optical disk 1, the optical pickup 2, the I-V conversion matrix circuit 8, the tracking servo circuit 12, and the target value setting and changing circuit 20. The optical pickup 2 includes a tracking coil 30 which forms the two axes actuator, a lens 32 which is finely adjustable in the direction of the track by the tracking coil 30 and forms the laser beam, and a beam splitter 31 which separates only the reflected light which is reflected by the optical disk 1.

Furthermore, the I-V conversion matrix circuit 8 in this tracking servo system includes the photo diode 21 which has the two divided light receiving planes A and B, and detects the reflected light of the optical disk 1 from the beam splitter 31, and the tracking error detector circuit 26 which inputs the respective signals from the two divided light receiving planes A and B of the photo diode 21 at a non-converting input (+) and a converting input (−) of a differential amplifier circuit, and detects the difference signal A-B as the tracking error signal.

Moreover, the target value setting and changing circuit 20 has a function which, in reproduction, sets the target value of the tracking servo to be "0" so that the tracking servo may work in the ontrack mode, and in recording, sets the target value of the tracking servo to be "+α" so that the tracking servo may work in the detrack mode, thus altering the setting of the target value of the tracking servo. Regarding the target value, a value which was found in advance by an experiment based on the optical system, the pit width on the recording thin film and the track pitch is set up as the initial target value. The detrack amount is set so that the edge portion of the track width in the direction toward the internal circumference of the disk may coincide with the circumference portion of a light beam spot which is formed by irradiating the laser beam on a track and which is effective upon the recording, in the direction toward the internal circumference of the disk.

Furthermore, the tracking servo circuit 12 includes an adder 27 which adds the target value from the target value setting and changing circuit 20 to the tracking error signal from the tracking error detector circuit 26, a LPF and phase compensation circuit 28 which removes noise and oscillation from an output of the adder 27 so that the servo may work based on the mean value, and compensates for a phase delay until it follows the target value, and a tracking driver 29 which amplifies an output from the LPF and phase compensation circuit 28 for outputting the tracking servo signal.

The tracking servo system as described above operates as follows. In this tracking servo system, the reflected light on the optical disk 1 separated by the beam splitter 31 is detected on the two divided light receiving planes A and B of the photo diode 21. The respective signals from the two divided light receiving planes A and B of the photo diode 21 are supplied to the non-converting input (+) and the converting input (−) of the differential amplifier circuit forming the tracking error detector circuit 26. The tracking error detector circuit 26 detects the difference signal A-B as the tracking error signal.

As described above, the target value setting and changing circuit 20 sets, in reproduction, the target value of the tracking servo to be "0" so that the tracking servo will work in the ontrack mode, and sets, in recording, the target value of the tracking servo to be "±α" so that the tracking servo will work in the detrack mode, thus altering the setting of the target value of the tracking servo.

Also, in the tracking servo circuit 12, the target value from the target value setting and changing circuit 20 is added to the tracking error signal from the tracking error detector circuit 26 in the adder 27. The added output from the adder 27 is supplied to the LPF and phase compensation circuit 28. In the LPF and phase compensating circuit 28 the noise and oscillation from the adder 27 are removed so that the servo will work on the mean value, and the phase delay until it follows the target value is compensated for. The output from the LPF and phase compensation circuit 28 is supplied to the tracking driver 29. In the tracking driver 29, the output from the LPF and phase compensation circuit 28 is amplified to a level such that it can drive the tracking coil 30 for outputting the tracking servo signal.

In the optical pickup 2, the lens 32 is finely adjusted by the tracking coil 30 in the direction of the track. In reproduction, the laser beam is formed by the lens 32 in the condition that the target value of the tracking servo is set to be "0" so that the target value of the tracking servo will work in the ontrack mode and then the recorded pits on the recording thin film of the optical disk 1 are reproduced. Also, in recording, the laser beam is formed by the lens 32 in the condition that the target value of the tracking servo is set to be "±α" so that the tracking servo will work in the detrack mode and then the recorded pits are formed on the recording thin film of the optical disk 1.

Figures 5A, 5B:
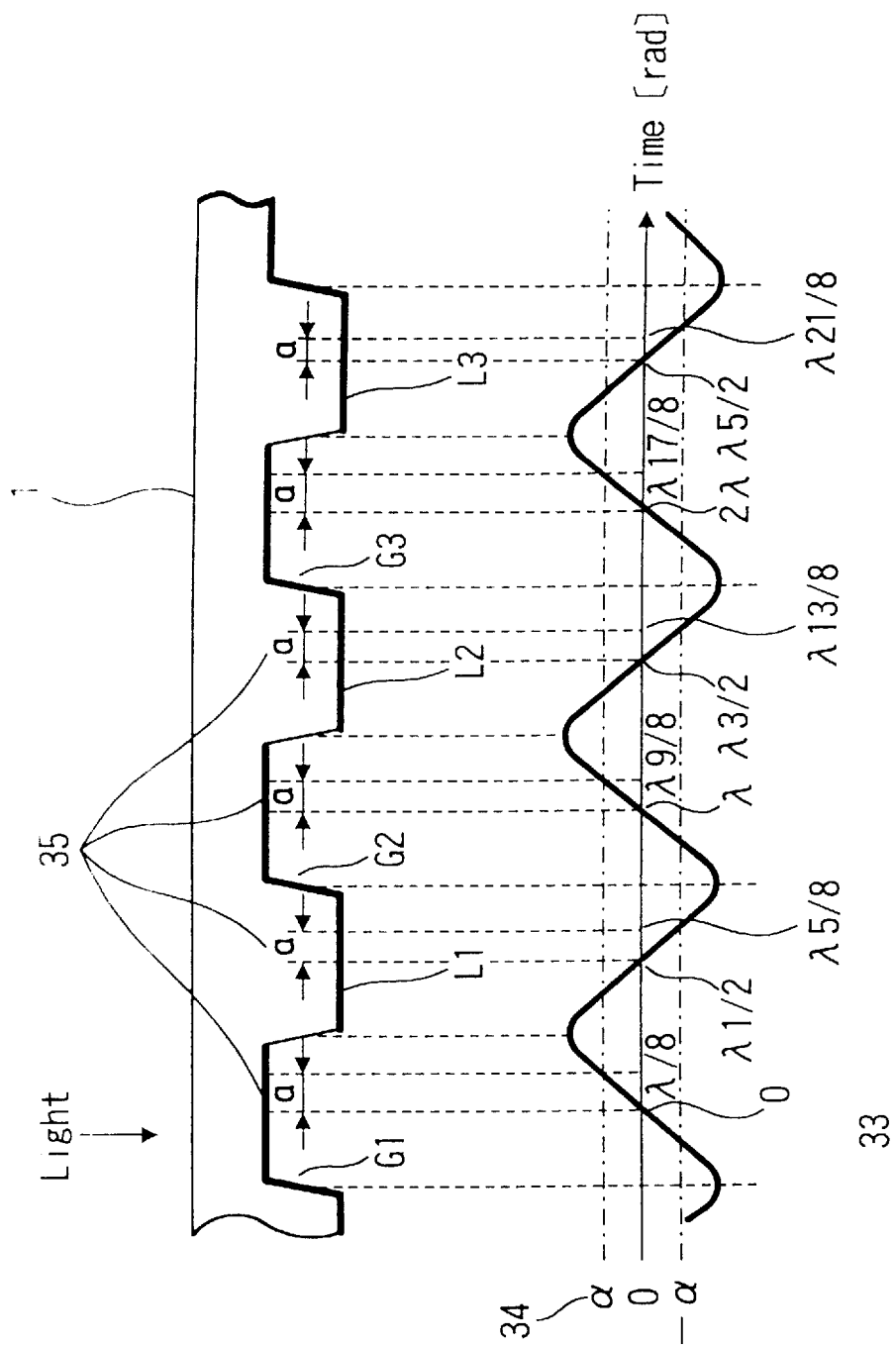

Such a tracking method as described above is called the push-pull method. Referring to FIGS. 5A and 5B, the tracking servo by the push-pull method using the function of setting/altering the target value according to the present embodiment will be described. Referring to FIG. 5A, in the land-groove recording method in which information data are recorded on both the groove portions G1, G2, G3 and portions called the land portions L1, L2, L3 between the groove portions G1, G2, G3 and the groove portions G1, G2, G3, in order to record the information data on both the groove portions G1, G2, G3 and the land portions L1, L2, L3 adjacent to each other, it is necessary to perform the tracking of both the groove portions G1, G2, G3 and the land portions L1, L2, L3.

The push-pull method is, as described above, the method which detects the tracking error by extracting the reflected and diffracted light in the groove portions G1, G2, G3 on the recording thin film of the optical disk 1 as the difference between outputs on the two divided light receiving planes of the photo diode 21. Specifically, as FIGS. 5A and 5B show, when the laser spot coincides with the center of the groove portions G1, G2, G3 or the center of the laser spot coincides with the center of the land portions L1, L2, L3, i.e. the middle portions between the groove portions G1, G2, G3, the tracking error signal 33 having a level of 0 as a symmetrical reflected/diffracted light distribution as shown in FIG. 5B is obtained. Otherwise, under the detrack conditions, the tracking error signal 33 is expressed as a S-shaped curve as the reflected/diffracted light distribution with asymmetrical light intensity.

In this instance, the target value setting and changing circuit 20, especially in reproduction, sets the target value of the tracking servo to be "0" for tracking in the ontrack state in which the respective centers of the groove portions G1, G2, G3 and the land portions L1, L2, L3 coincide with the center of the laser spot, so that the tracking servo may work at respective time points 0, $\lambda/2$, $\lambda$, $\lambda 3/2$, $2\lambda$, $\lambda 5/2$ with respect to one wave length $\lambda$ of the tracking error signal 33 shown in FIG. 5B.

However, in recording, the target value of the tracking servo is set to be "+α" with respect to the groove portions G1, G2, G3 for tracking in the detrack state in which the centers of the groove portions G1, G2, G3 and the center of the laser spot are offset from each other by a detrack-offset amount "a" denoted by 35 and the setting of the target value of the tracking servo is altered, so that the tracking servo may work at respective time points $\lambda/8$, $\lambda 9/8$, $\lambda 17/8$ with respect to one wave length $\lambda$ of the tracking error signal 33 shown in FIG. 5B.

Moreover, the target value is set to be "−α" with respect to the land portions L1, L2, L3 for tracking in the detrack state in which the centers of the land portions L1, L2, L3 and the center of the laser spot are offset from each other by the amount of detrack-offset "a" and the setting of the target value of the tracking servo is altered, so that the tracking servo may work at respective time points $\lambda 5/8$, $\lambda 13/8$, $\lambda 21/8$ with respect to one wave length $\lambda$ of the tracking signal.

In this way, by altering the setting of the target value of the tracking servo so that the tracking servo will work in the detrack mode, it is possible to perform the tracking in the detrack mode in which each of the groove portions G1, G2, G3 and the land portions L1, L2, L3 on the recording thin film of the optical disk 1 is offset from each other by the detrack-offset amount "a" denoted by 35.

Figure 6:
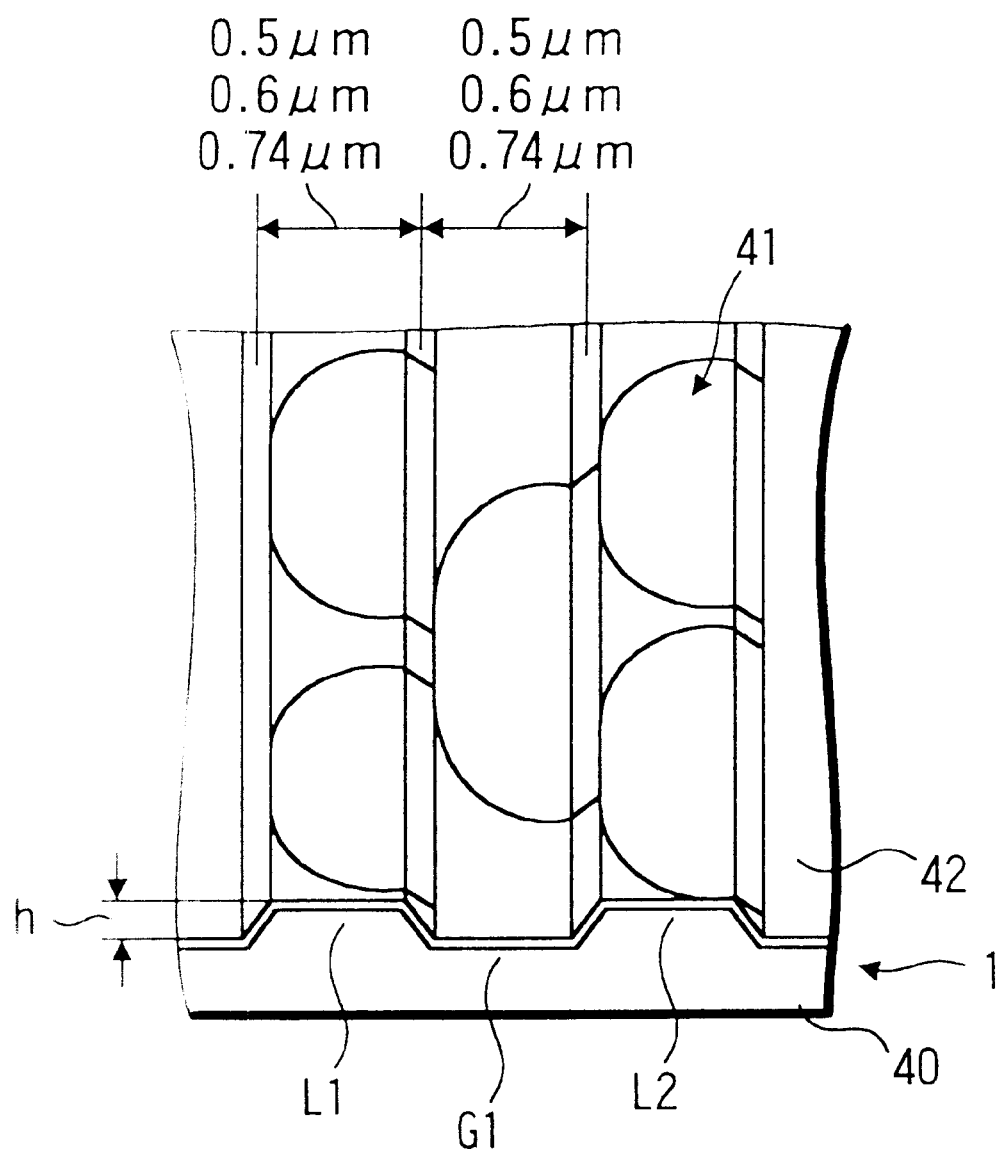
FIG. 6 is a diagram showing land-groove recording according to the present invention.

Next, the land-groove recording according to the present embodiment will be described with reference to FIG. 6. As already stated in the prior art, the recording was performed in the past by the groove recording method in which a pit called a record mark 41 was formed only in the groove portion G1 on the recording thin film 42 formed on a resin substrate 40 of the optical disk 1. The land-groove recording method begins to be used, in which the record mark 41 is formed also on the land portions L1, L2 between the groove portion G1 and a front and a rear groove portions G0, G2 not shown, as shown in FIG. 6. When the land-groove recording method is utilized, an advantage is provided in which it is possible to acquire twice as high track recording density with the conventional substrate molding technique and tracking servo technique.

In this context, if the track pitch is made small, the cross-erasing which erases the recorded signal in the adjacent tracks or the cross talk which reads the recorded signal in the adjacent tracks are generated, as mentioned as the problem to be solved. In case of the cross talk, if the reproduction is performed by the change of reflectance like the phase change recording described later, it is possible to reduce it by making a depth h of the groove portion G1 about $\lambda/6$ relative to a wavelength $\lambda$ of the beam. In this case, using the optical system in which the wavelength of the laser beam $\lambda=680$ [nm] and the numerical aperture NA=0.6, it is possible to perform the recording/reproducing which is not affected by the cross talk even if the groove width and the land width of the track pitch is 0.74 [$\mu$m]. Particularly, assuming that the reflectance of the record mark is low enough to be non-reflective and the reflectance of the non-recorded portion is sufficiently high, since the cross talk is caused by a difference of the reflected light quantity which reaches the photodiode 21 through the objective lens between the case where there is a record on an adjacent track and the other case, the aforesaid condition can be obtained by finding the dependency of the reflected light quantity on the groove depth h. They are evident by the experiment.

Contrary to this, the cross-erasing has a great influence even in the case where the effective diameter of the laser beam is 1 [$\mu$m] and the groove width and the land width as the track pitch are 0.74 [$\mu$m]. As shown in FIG. 6, in a future optical disk of the next generation, it is demanded and examined to make widths of the groove G1 and the land L1, L2 to be 0.6 [$\mu$m] or 0.5 [$\mu$m]. The influence of the cross-erasing in this case will be estimated to be further greater.

Therefore, in the present embodiment, the setting of the target value of the tracking servo is altered by the target value setting and changing circuit 20 for detracking to the adjacent track in the recording direction, thereby causing the laser spot to be detracked to the adjacent track in the recording direction for recording, so that the cross-erasing which erases the recorded mark recorded in the adjacent track in the direction toward the internal circumference of the disk can be prevented.

Figure 7A:
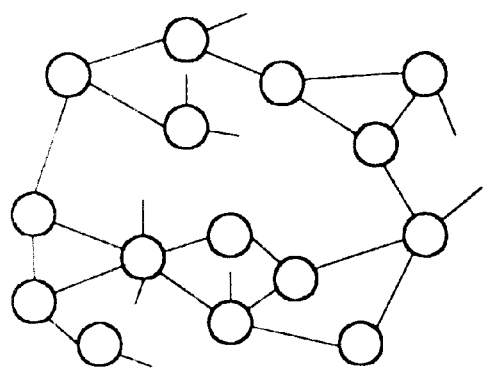
Figure 7B:
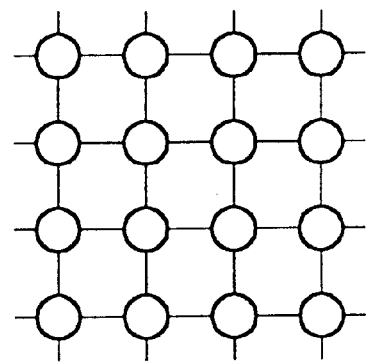

Next, referring to FIGS. 7A and 7B, the principle of the phase change recording will be described. Generally, the phase change disk is initially in the crystalline state as shown in FIG. 7B, and the recording is performed by changing the crystalline state into the amorphus (non-crystalline) state as shown in FIG. 7A, whereas the erasing is performed by changing the amorphous state shown in FIG. 7A into the crystalline state as shown in FIG. 7B. Specifically, in recording, the temperature of the recording thin film of the optical disk 1 is raised to the melting point by the irradiation of the laser beam with the write power, and then the temperature is quickly lowered for rapid cooling without causing the solidification to create the amorphus state as shown in FIG. 7A. In erasing, the temperature of the recording thin film of the optical disk 1 is raised to the melting point by the irradiation of the laser beam with the erase power, and then the temperature is gradually lowered with small cooling speed or the temperature is kept over the temperature which causes the amorphous state for a certain time period, thereby returning to the crystalline state. In particular, it is called fused crystallization or liquid phase crystallization to crystallize from the state in which the temperature is raised over the melting point, and it is called solid phase crystallization to crystallize from an over-cooled liquid state.

Properties which are necessary for materials to perform such a phase change as described above will be shown below. Concerning reproduction, the first property is that the change of the optical constant (refractive index) between the crystalline state and the amorphous state is large. The second property is that the diameter of the crystal grain is small. In addition to these properties, concerning recording/erasing, in order to enable a sufficient crystallization, namely high speed erasing by the heat which the scanning laser spot affords. The third property in which the crystallizing speed can to some extent quickly be controlled is necessary. The fourth property is that the kind of crystal formed is few (the atomic diffusion requires little time). In order to form the amorphous mark by the laser pulse with high power, the fifth property in which the minimum cooling speed required for making the amorphous state (critical cooling speed) is not too large is needed.

Furthermore, in order to ensure a sufficient number of times of rewriting, it is necessary for the film organization not to change in a process of fusion to solidification. Particularly, in order to make it difficult to produce a difference of separated organization (segregation) between a central portion and its circumferential portion due to a temperature distribution within a surface of a heat-melted portion by the recording laser spot, the sixth property in which its composition is close to that of a chemical compound and one kind of crystal is formed and the seventh property in which, if two or more kinds of crystals are formed, a difference between the melting point is small are needed. Moreover, in order to suppress a structural change due to the growth of the crystal grain boundary, it is required that the crystal grain diameter is small, and so on.

The recording and erasing of information are performed by using the aforesaid material as the recording thin film, heating the recording thin film by laser light irradiation to raise its temperature and causing the crystalline phase change in its structure. The reproduction of information is performed by detecting the reflectance change resulting from the change of the optical constant between the phases.

The amorphous state as described above is obtained by heating the recording thin film by laser light irradiation to raise its temperature to the melting point or over and cooling rapidly after it is melted. The crystalline state is obtained by heating to raise its temperature higher than the crystallizing temperature but lower than the melting point. The rapid cooling and gradual cooling are a relative concept and its absolute value differs depending on its material. However, in order to obtain the general amorphous state, a cooling speed of about 107–109 [deg/sec] is required.

When it is utilized as the optical disk 1, the phase change must be realized by the irradiation of a laser beam with a diameter of 1 [$\mu$m], for example. When the laser beam with a diameter of 1 [μm] passes at a linear velocity of 10 [m/sec], a time period in which the light irradiates a certain point on the disk is only 100[n sec], during which time period the phase change must be caused.

Since the amorphous state is obtained by melting and rapid cooling, that time period can be shortened as far as the laser power allows. However, because the crystalline state is the rearrangement of atoms, a time period for crystallization depending on the material nature is necessary. Therefore, materials used for the phase change type of optical disk need not only that the amorphous state thereof be stable, but also that they are crystallized in such a short period of time as 100 [n sec].

If the crystallizing speed of materials is sufficiently large and the crystallizing time period is so short that they are crystallized within the passage time of the laser beam, it will be possible to perform by a single beam the overwriting operation in which new data are written while already recorded data are erased through one beam by modulating the laser power between the write (amorphous state) power and the erase (crystalline state) power.

If new data are recorded by using pulse width modulated laser light, in the track where data are already recorded, a portion which is irradiated with the write power is fused and cooled rapidly to go into the amorphous state in spite of a previous state, and a portion which is irradiated with the erase power is likewise crystallized irrespective of a previous state. In this way, by irradiating the laser light once, it is possible to record new data overwritten while erasing previous data.

Figure 8A:
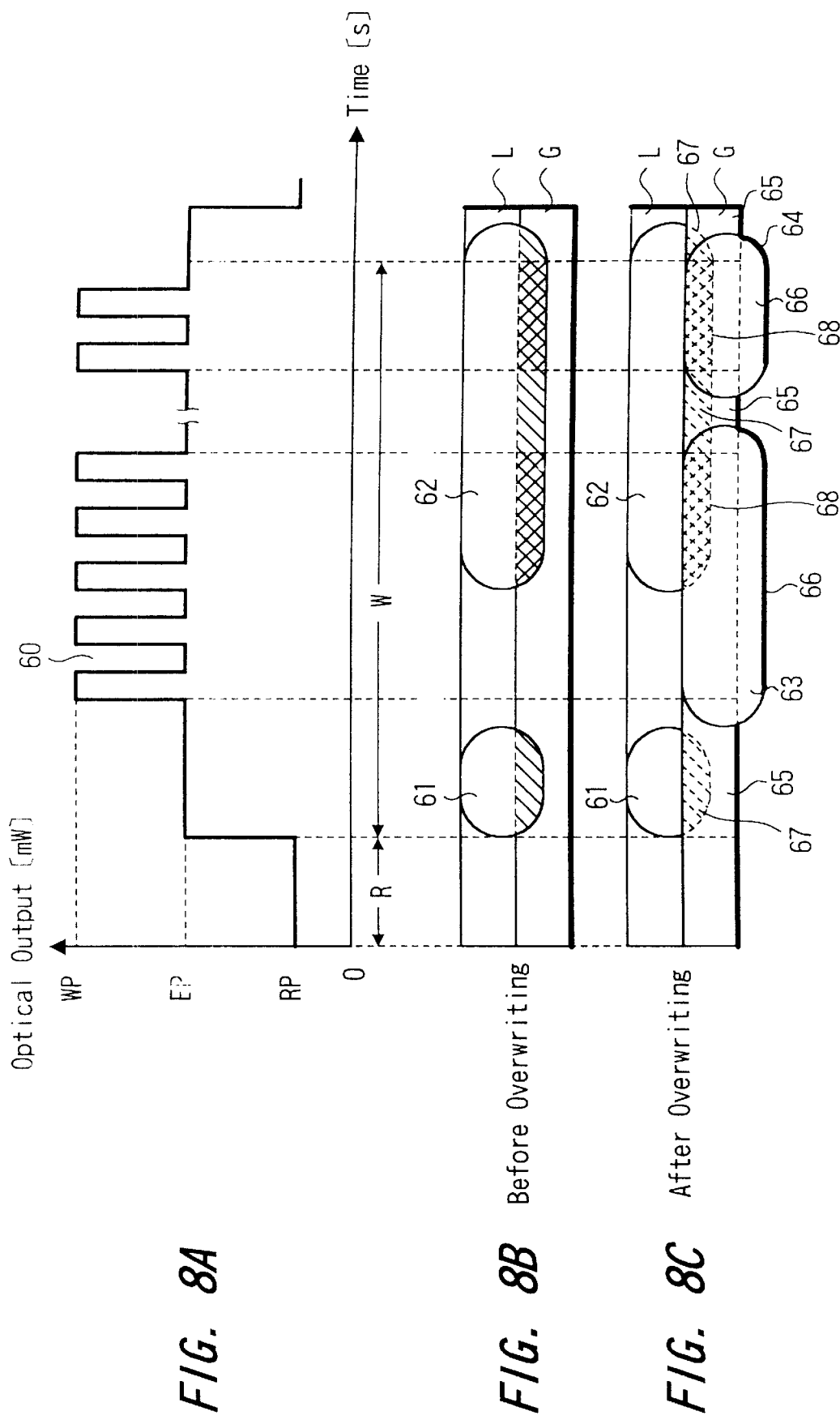

Referring to FIGS. 8A to 8C, the overwriting of the phase change recording according to the present embodiment will be described.

An optical recording method according to the present embodiment will be described below in further detail.

In FIG. 8A, the vertical axis represents a light output of the laser beam output by the laser control circuit 6, and the horizontal axis represents a time [s]. The light output of the laser beam has three steps of levels i.e. the write power WP which is a high level output to enable a writing operation W, the erase power EP which is a middle level output to enable an erasing operation E, and the read power RP which is a low level output to enable a reading operation R. In addition, the erasing operation E can be performed simultaneously with the writing operation W by modulating the light pulse in the PWM driver 14 or performed independently before the writing operation W.

In FIG. 8B, record marks 61 and 62 which are formed by the laser beam on the land portion L and the groove portion G before the overwriting operation are shown. Also, in FIG. 8C, the record marks 61, 62, 63 and 64 which are formed by the laser beam on the land portion L and the groove portion G after the overwriting operation are shown. Further, in FIGS. 8B and 8C, it is assumed that the land portion L and the groove portion G are arranged in this sequence toward the external circumference of the disk and the recording operation proceeds in the direction from the land portion L to the groove portion G. Particularly, in FIG. 8B, while the record marks 61 and 62 are formed on the land portion L before the overwriting operation, because the laser beam spot diameter is larger than the width of the land portion L and the groove portion G of the track pitch, they are recorded sticking out into the adjacent groove portion G in the direction toward the external circumference of the disk as shown by the hatched portion. In this condition, the new record marks 63 and 64 are formed on the groove portion G after the overwriting operation, as shown in FIG. 8C.

Firstly, as shown in FIG. 8A, during a period of the reading operation R, the light output of the laser beam goes to have the read power RP enabling the reading operation R with the low level output. Next, during a period of the writing operation W, the light output of the laser beam goes to have the erase power EP enabling the erasing operation E with the middle level output before the writing operation W. At this time, as shown in FIG. 8B, there exists the record mark 61 which has been formed on the land portion L and the groove portion G by the laser beam before the overwriting operation. Its portion shown by the hatching is the portion which sticks out into the groove portion G. This hatched portion stuck out into the groove portion G changes into the crystalline state 65 after the overwriting by the erase power EP as shown in FIG. 8C, thus making that portion to be in an erased state 67 as shown by dotted lines. In this manner, a track portion in which the record mark is not formed is changed into the crystalline state 65, namely the erased state 67.

Next, the light output of the laser beam goes to a light pulse 60 which is pulse width modulated between the write power WP enabling the writing operation W with the high level output and the erase power EP enabling the erasing operation E with the middle level output. As shown in FIG. 8C after the overwriting the new record mark 63 is formed on the groove portion G by going into the amorphous state 66. At this time, as shown in FIG. 8B, there exists the record mark 62 which has been formed by the laser beam on the land portion L and the groove portion G before the overwriting operation. Its crosshatched portion is the portion which sticks into the groove portion G. As shown in FIG. 8C, since this crosshatched portion stuck into the groove portion G changes into the amorphous state 66 after the overwriting by the light pulse 60 pulse width modulated, that portion is made to be in an overwritten state 68 as shown by dotted lines. In this manner, a track portion in which the record mark is formed is changed into the amorphous state 66, namely the overwritten state 68.

Like wise, during a period of the subsequent writing operation W, the light output of the laser beam goes to have the erase power EP which enables the erasing operation E with the middle level output, before performing the writing operation W. At this time, as shown in FIG. 8B there exists the record mark 62 which has been formed by the laser beam on the land portion L and the groove portion G before the overwriting operation. Its portion shown by the hatching is the portion which sticks out into the groove portion G. This hatched portion changes into the crystalline state 65 after the overwriting by the erase power EP as shown in FIG. 8C, which makes that portion to be in the erased state 67 as shown by dotted lines. In this same manner, a track portion in which the record mark is not formed is changed into the crystalline state 65, namely the erased state 67.

Similarly, during a period of subsequent writing operation W, the light output of the laser beam goes to the light pulse 60 which is pulse width modulated between the write power WP enabling the write operation W with high level output and the erase power EP enabling the erase operation E with middle level output. Thus, as shown in FIG. 8C, the new record mark 64 is formed on the groove portion G which goes to the amorphous state 66 after the overwriting. At this time, as shown in FIG. 8B, there exists the record mark 62 which has been formed by the laser beam on the land portion L and the groove portion G before the overwriting operation. Its portion shown by the crosshatching is the portion which sticks out into the groove portion G. Since the crosshatched portion sticking out into the groove portion G goes to the amorphous state 66 after the overwriting by the light pulse 60 pulse width modulated, as shown in FIG. 8C, that portion is made to be in the overwritten state 68 shown by dotted lines. In this same manner, a track portion in which the record mark is formed is changed into the amorphous state 66, namely the overwriting state 68.

Likewise, during a period of the subsequent writing operation W, the light output of the laser beam goes to have the erase power EP which enables the erasing operation E with the middle level at the last stage of the writing operation W. At this time, there exists the record mark 62 which has been formed by the laser beam on the land portion L and the groove portion G before the overwriting operation, as shown in FIG. 8B. Its portion shown by hatchings is the portion which sticks out into the groove portion G. This shaded portion stuck to the groove portion G changes into the crystalline state 65 after the overwriting by the erase power EP as shown in FIG. 8C, which makes that portion to be in the erased state 67 as shown by dotted lines. In this same way, a track portion in which the record mark is not formed is changed into the crystalline state 65, namely the erased state 67.

Thus, since the laser beam is offset by the predetermined amount to the following track in the recording direction by means of the target setting/altering means 20 so that the tip end of the laser beam in the direction toward the internal circumference of the disk may coincide with the tip end of the land portion L or the groove portion G in the direction toward the internal circumference of the disk, the portion of the record mark which sticks out into the adjacent track in the direction toward the external circumference of the disk is erased by the erasing operation or overwritten by the overwriting operation, thus causing the new record marks to be formed sequentially, which makes the record marks to be formed in the effective track width of the land portion L or the groove portion G.

Since, by recording the record marks in this way, it will never happen to erase the record mark within the effective track width of the land portion L or the groove portion G of the adjacent track in the direction toward the internal circumference of the disk, it is possible to solve the cross-erasing problem.

Moreover, even if the effective track width of the land portion L or the groove portion G of the track pitch may be made smaller against the diameter of the light beam spot, it is possible to erase by the erasing operation or to form sequentially the new record marks by the overwriting operation without causing cross-erasing, thereby allowing the record marks to be formed in the effective track width of the land portion L or the groove portion G.

Figure 9:
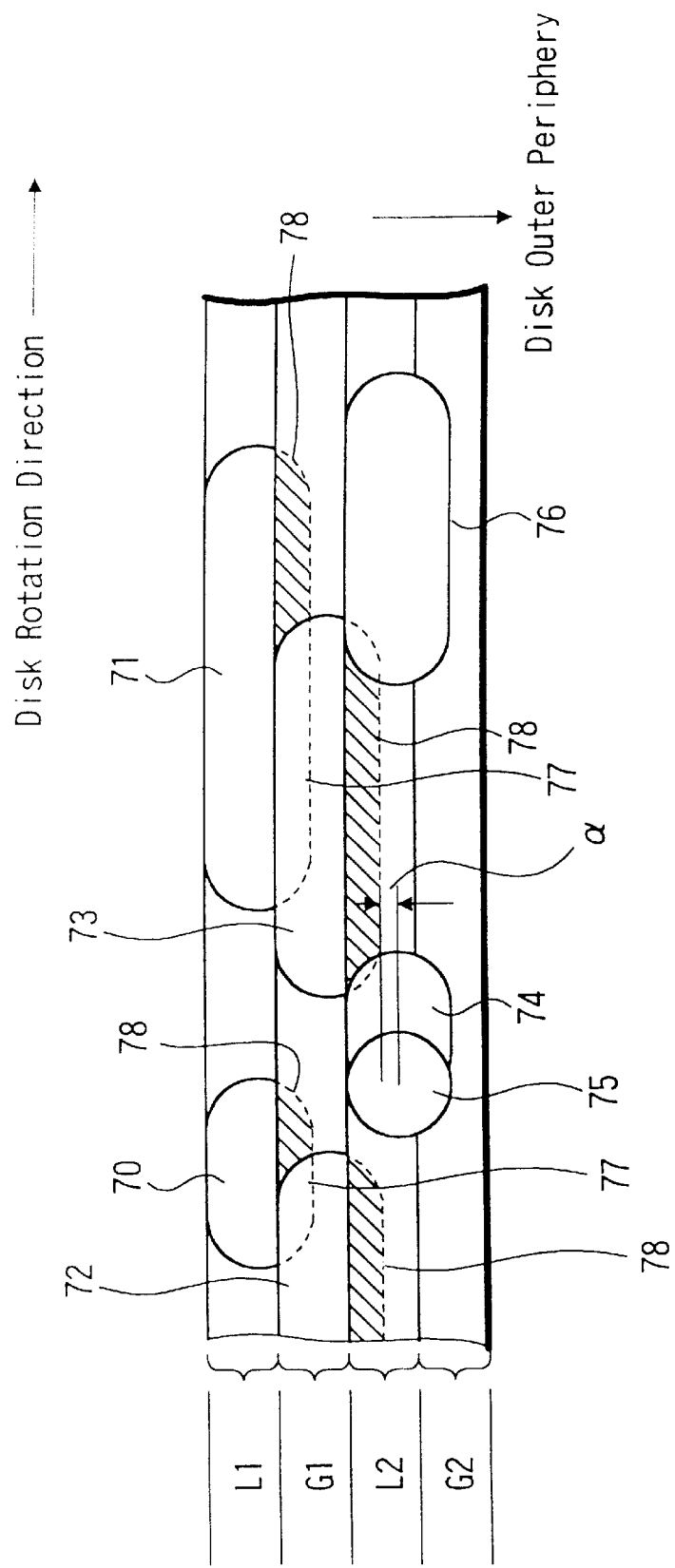
FIG. 9 is a diagram showing a land-groove recording method according to the present invention.

FIG. 9 shows the specific operation of the landgroove recording method according to the present embodiment using the aforesaid phase change recording and overwriting recording, which will be described below. This embodiment is to be used in a sequential recording in which video data are recorded continuously on a disk. Furthermore, it is applicable not only to the continuous recording of the data on all the tracks on the disk but also to the recording in which a data group are recorded on a desired track of the disk if the data group is continuously recorded on a plurality of continuous tracks. Moreover, the recording method according to the present invention can be applied when no data is recorded on a track succeeding the track where data is to be recorded and when unnecessary data is recorded thereon.

Referring to FIG. 9, the laser spot of a laser beam is that of the laser beam which is output from the laser control circuit 6 of FIG. 3 as shown in FIGS. 8A to 8C. In the same way as shown in FIGS. 8A to 8C, the light output of the laser beam has three steps of levels, namely, the write power WP which is a high level output and enables the writing operation W, the erase power EP which is a middle level output and enables the erasing operation E and the read power RP which is a low level output and enables the reading operation R. Further, the erasing operation E can be performed simultaneously with the writing operation W by modulating the light pulse in the PWM driver 14. Also, it is needless to say that the erasing operation E can be performed independently before performing the writing operation W. Again, in FIG. 9, the land portion L1, the groove portion G1, the land portion L2 and the groove portion G2 are arranged in this sequence toward the external circumference of the disk, and it is assumed that the recording operation will proceed in the direction from the land portion L1 to the groove portion G1, the land portion L2 and the groove portion G2.

Referring to FIG. 9, record marks 70 and 71 are first formed by the laser beam on the land portion L1 on the side of the internal circumference of the disk along the direction of disk rotation. Next, new record marks 72 and 73 are formed by overwriting with the laser beam on the groove G1 adjacent the land portion L1 in the direction toward the external circumference of the disk. At this time, while the record marks 70 and 71 are formed on the land portion L1 before the overwriting operation, because the diameter of the laser beam spot 75 is larger than each width of the land portion L1 and the groove portion G1, they are recorded sticking out into the adjacent groove portion G1 in the direction toward the external circumference of the disk as shown by the hatched portions. The operation in which the new record marks 72 and 73 are formed in this condition on the groove portion G1 after the overwriting operation on the groove portion G1 will be described.

To begin with the writing operation, the light output [mW] of the laser beam goes to the light pulse which is pulse width modulated between the write power WP enabling the writing operation W with the high level output and the erase power EP enabling the erasing operation E with the middle level output. Thus, as shown in the groove portion G1, the new record mark 72 is formed on the groove portion G1 due to the amorphous state resulting after the overwriting. At this time, there exists the record mark 70 which has been formed by the laser beam on the land portion L1 and the groove portion G1 before the overwriting operation as shown in the groove portion G1. Its portion shown by a broken line is the portion which sticks out into the groove portion G1. The portion shown by a broken line sticking out into the groove portion G1 is changed into the amorphous state, as shown in a groove portion G1, after the overwriting by the pulse width modulated light pulse, thereby causing that portion to be in the overwritten state 77 as shown by a broken line. In this manner, the track portion on which the record mark is formed is changed into the amorphous state, namely the overwritten state 77.

Next, as shown on the groove portion G1 in the direction of disk rotation, the light output of the laser beam goes to have the erase power EP enabling the erasing operation with the middle level output. At this time, there exists the record mark 70 which has been formed by the laser beam on the land portion L1 and the groove portion G1 before the overwriting operation. Its portion shown by the hatching is the portion which sticks out into the groove portion G1. The hatched portion sticking out into the groove portion G1 changes, as shown in the groove portion G1, into the crystalline state after overwriting by the erase power EP, thereby causing that portion to be in an erased state 78. In this manner, the track portion on which the record mark is not formed is changed into the crystalline state, namely the erased state 78.

Next, as shown on the groove portion G1 in the direction of disk rotation, the light output of the laser beam goes to the light pulse, for the writing operation, which is pulse width modulated between the write power WP enabling the writing operation W with the high level output and the erase power EP enabling the erasing operation E with the middle level output. Therefore, as shown in the groove portion G1, the new record mark 73 is formed on the groove portion G1 due to the amorphous state resulting after the overwriting. At this time, there exists the record mark 71 which has been formed by the laser beam on the land portion L1 and the groove portion G1 before the overwriting operation as shown in the groove portion G1. Its portion shown by a broken line is the portion which sticks out into the groove portion G1. By the pulse width modulated light pulse, the portion shown by a broken line sticking out into the groove portion G1, as shown in the groove portion G1, changes into the amorphous state after the overwriting, thus making that portion to be in the overwritten state 77. In this manner, the track portion on which the record mark is to be formed is changed into the amorphous state, namely the overwritten state 77.

Next, as shown on the groove portion G1 in the direction of disk rotation, the light output of the laser beam goes to have the erase power EP which is the middle level output and enables the erasing operation E. At this time, there exists the record mark 71 which has been formed by the laser beam on the land portion L1 and the groove portion G1 before the overwriting operation. Its portion shown by the hatching is the portion which sticks into the groove portion G1. By the erase power Ep, the hatched portion sticking out into the groove portion G1, as shown in the groove portion G1, changes into the crystalline state after the overwriting, thereby causing that portion to be in the erased state 78. In this manner, the track portion on which the record mark is not formed is changed into the crystalline state, namely the erased state 78.

Likewise, as shown on the land portion L2 in the direction of disk rotation the light output of the laser beam goes to have the erase power EP enabling the erasing operation E with the middle level output before the writing operation W. At this time, there exists the record mark 72 which has been formed by the laser beam on the groove portion G1 and the land portion L2 before the overwriting operation. Its portion shown by the hatching is the portion which sticks out into the land portion L2. By the erase power EP, the hatched portion sticking out into the land portion L2, as shown on the land portion L2, changes into the crystalline state after the overwriting, thus making that portion to be in the erased state 78 as shown by the hatching. In this same manner, the track portion on which the record mark is not formed is changed into the crystalline state, namely the erased state 78.

Similarly, as shown on the land portion L2 in the direction of disk rotation, during a period of subsequent writing operation W, the light output of the laser beam goes to the light pulse which is pulse width modulated between the write power WP enabling the writing operation W with the high level output and the erase power EP enabling the erasing operation with the middle level output. Therefore, as shown on the land portion L2, the new record mark 74 is formed on the land portion L2 due to the amorphous state resulting after the overwriting. At this time, the record mark 74 changes into the amorphous state after overwriting by the pulse width modulated light pulse, which makes that mark to be in the overwritten state. In this same manner, the track portion on which the record mark is formed is changed into the amorphous state, namely the overwritten state 77.

Likewise, as shown on the land portion L2 in the direction of disk rotation, the light output of the laser beam goes to have the erase power EP which is the middle level output and enables the erasing operation E. At this time, there exists the record mark 73 which has been formed by the laser beam on the groove portion G1 and the land portion L2 before the overwriting operation. Its portion shown by the hatching is the portion which sticks out into the land portion L2. By the erase power EP, the hatched portion sticking out into the land portion L2, as shown on the land portion L2, changes into the crystalline state after overwriting, thereby causing that portion to be in the erased state as shown by the hatching. In this same manner, the track portion on which the record mark is not formed is changed into the crystalline state, namely the erased state 78.

Similarly, as shown on the land portion L2 in the direction of disk rotation, at the last of a period of subsequent writing operation W, the light output of the laser beam goes to the light pulse which is pulse width modulated between the write power WP enabling the writing operation with the high level output and the erase power EP enabling the erasing operation E with the middle level output. Therefore, as shown on the land portion L2, a new record mark 76 is formed on the land portion L2 due to the amorphous state resulting after the overwriting. At this time, the record mark 76 changes into the amorphous state after overwriting by the pulse width modulated light pulse, thereby causing that mark to be in the overwritten state. In this same manner, the track portion on which the record mark is formed is changed into the amorphous state, namely the overwritten state 77.

In this way, since the target value setting and changing circuit 20 offsets the laser beam by the detrack-offset amount "a" so that the tip end of the laser beam in the direction toward the internal circumference of the disk will coincide with the tip end of the land portion L1 or the groove portion G1 and the land portion L2 or the groove portion G2 in the internal circumference of the disk, the portions sticking out into an adjacent track in the direction toward the external circumference of the disk are erased by the erasing operation, or the record marks 70, 71, 72, 73, 74 and 76 are formed on the effective track width of the land portion L1 or the groove portion G1 and the land portion L2 or the groove portion G2 by sequentially forming the new record marks through overwriting the sticking portions.

Since, by recording the record mark in this manner, the record marks 70, 71, 72, 73, 74 and 76 within the effective track width of the land portion L1 or the groove portion G1 and the land portion L2 or the groove portion G2 of an adjacent track will never be erased, the cross-erasing problem can be solved.

Even if the effective track width of the land portion L1 and the groove portion G1 as well as the land portion L2 and the groove portion G2 may be made as smaller relative to the diameter of the laser beam spot 75, by erasing through the erasing operation or forming the record marks 70, 71, 72, 73, 74 and 76 through the overwriting operation without causing the cross-erasing, it is possible to form the record marks 70, 71, 72, 73, 74 and 76 in the effective track width of the land portion L1 or the groove portion G1 and the land portion L2 or the groove portion G2.

Figure 10B:
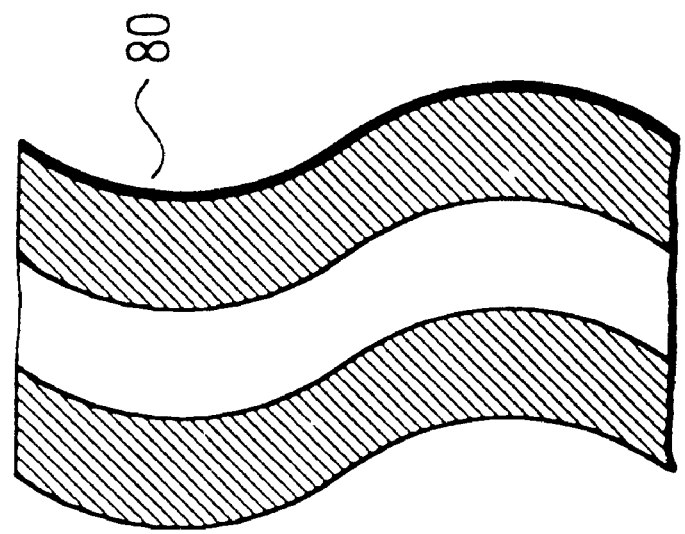
Figure 10A:
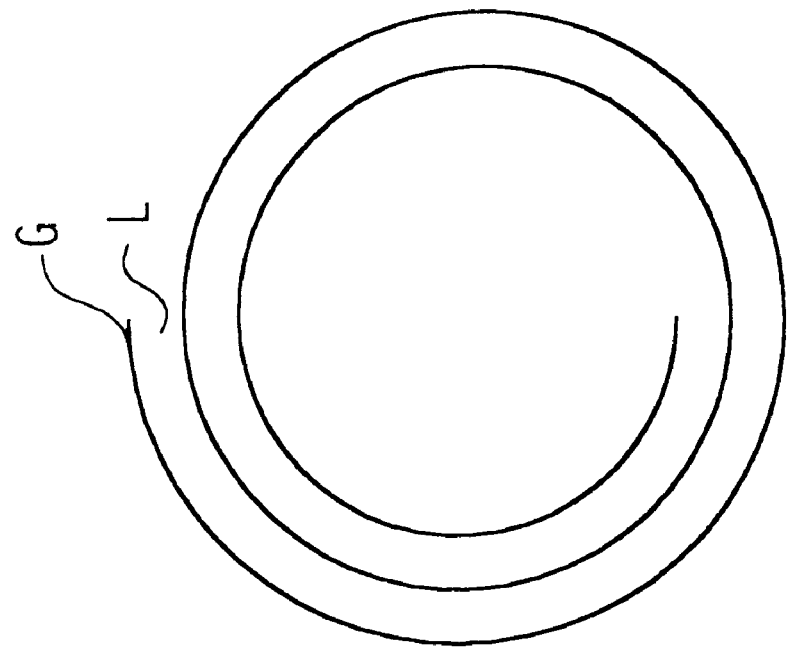

FIG. 10 shows the formation of a double spiral groove of the optical disk according to the present embodiment. FIG. 10A shows a double spiral groove G which is illustrated as a spiral solid line. The groove G is before hand formed spirally on the resin substrate of the optical disk with a predetermined track width in the direction from its internal circumference toward its outer circumference. At this time, the land L is formed between the adjacent grooves G. FIG. 10B shows a track location information 80 provided on the groove G. The track location information 80 is recorded on the groove G and is frequency modulated as address information so that the groove G should be zigzag-shaped. By detecting the track location information 80, the system control circuit 19 is able to recognize the recorded position of the groove G or the land L.

Figure 11B:
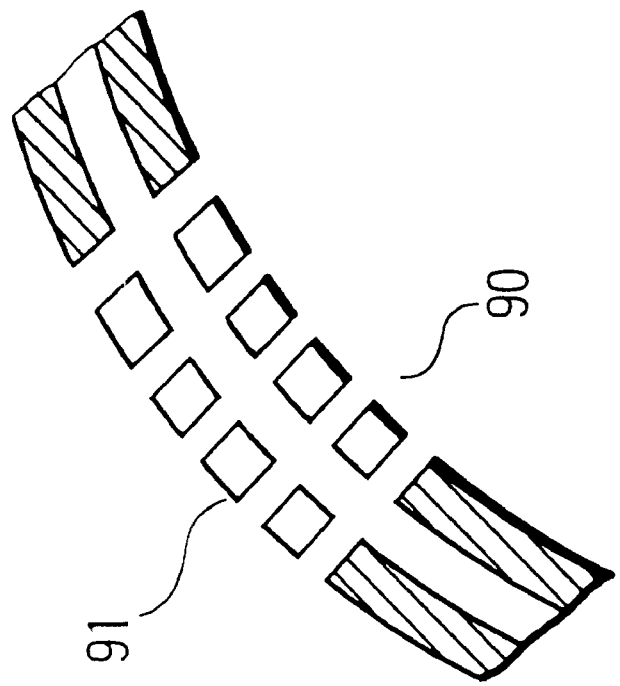
Figure 11A:
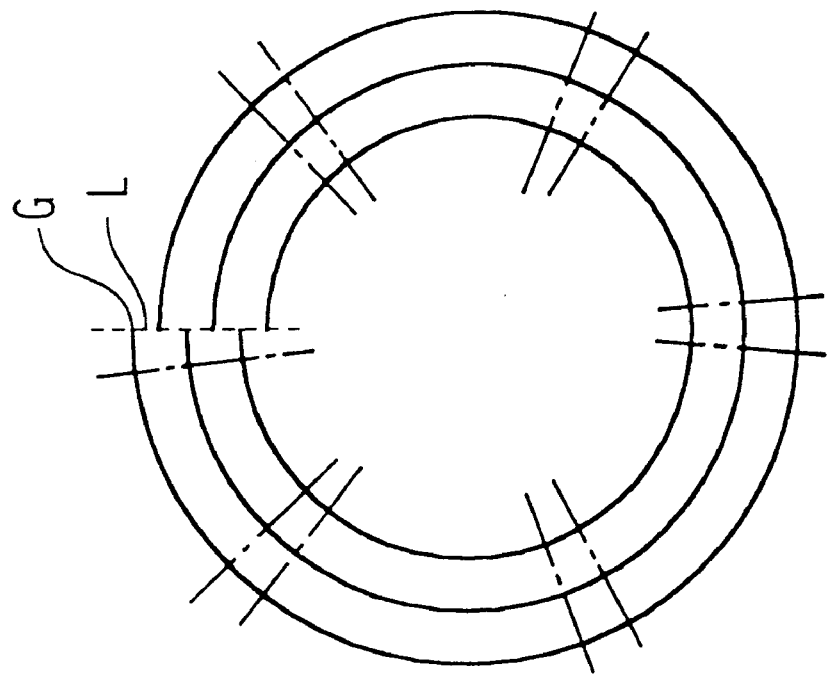

FIGS. 11A and 11B shows the formation of a single spiral groove of the optical disk according to the present embodiment. FIG. 11A shows a single spiral groove G which is illustrated as spiral solid lines. The groove G and the land L are spirally and continuously formed beforehand on the resin substrate of the optical disk with a predetermined track width in the direction from its internal circumference toward its external circumference. In this case, the land L is formed continuously after formation of the groove G and the groove G is formed continuously after formation of that land L and so on, such that they are sequentially formed in alternate manner toward the external circumference of the disk. In addition, partitions are provided at every predetermined sector of the groove G or the land L as shown by one-dot chain lines. FIG. 11B shows track location information 90 provided in the partitions of the groove G shown in FIG. 11B. The track location information 90 is recorded as address information of the sector by providing record marks 91 in every predetermined sector. In the same way, by detecting the track location information 90, the system control circuit 19 can recognize the recorded position on the groove G or the land L.

Figure 12:
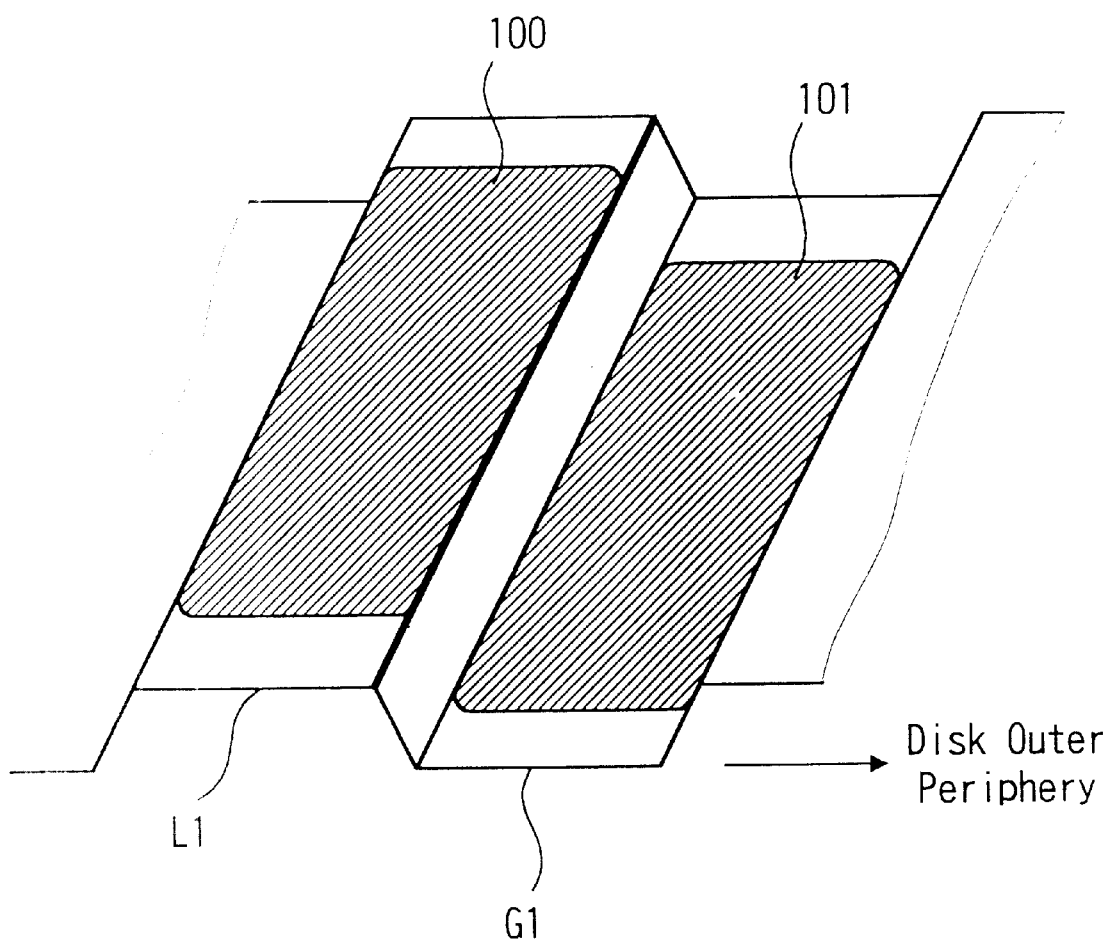
FIG. 12 is a diagram showing the recorded condition of the record marks by the land-groove recording method according to the present invention.

FIG. 12 shows a recorded condition of the record marks by the land-groove recording method according to the present embodiment. As described above, the record marks formed on the groove G and the land L are formed on the recording thin film of the optical disk in such a condition as shown in FIG. 12. Particularly, as FIG. 12 shows, a record mark 100 is formed on the land portion L1 in the effective width thereof. However, on the groove portion G1 adjacent to the land portion L1 in the direction toward the external circumference, since the overwriting operation is performed as previously described, the record mark portion sticking out from the land portion L1 into the groove portion G1 is erased in advance to disappear, which creates a condition in which only a new record mark 101 is formed in the effective width of the groove portion G1. The record marks 100, 101 are sequentially formed in all the width direction areas of the groove G and the land L. The target value of the tracking servo is reset to "0" by the target value setting and changing circuit 20 in reproduction, thereby allowing the laser beam to track a central position in the width direction of the groove G and the land L. Therefore, it is possible to obtain the reproduced signal without the cross talk on the conditions as previously described.

Figure 13:
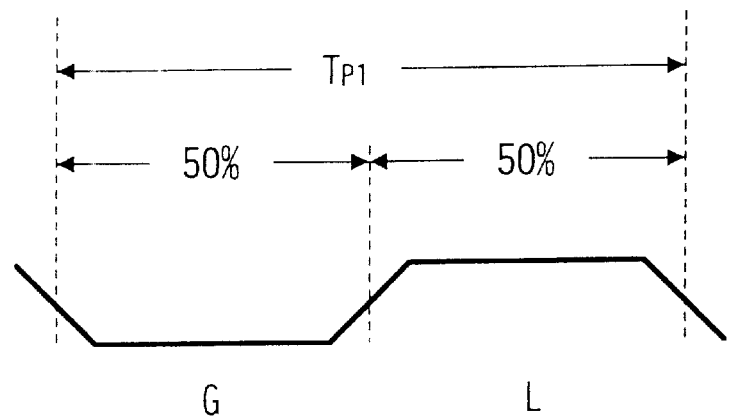
FIG. 13 is a diagram showing the track pitch in the land-groove recording method according to the present invention.

FIG. 13 shows the track pitch of the land-groove recording method according to the present embodiment. In the present embodiment, the sum of the two respective effective widths of the groove G and the land L is called a track pitch $Tp_1$. In the track pitch $Tp_1$, each width of the groove G and the land L has an equal length, that is, 50% in length, respectively.

Figure 14:
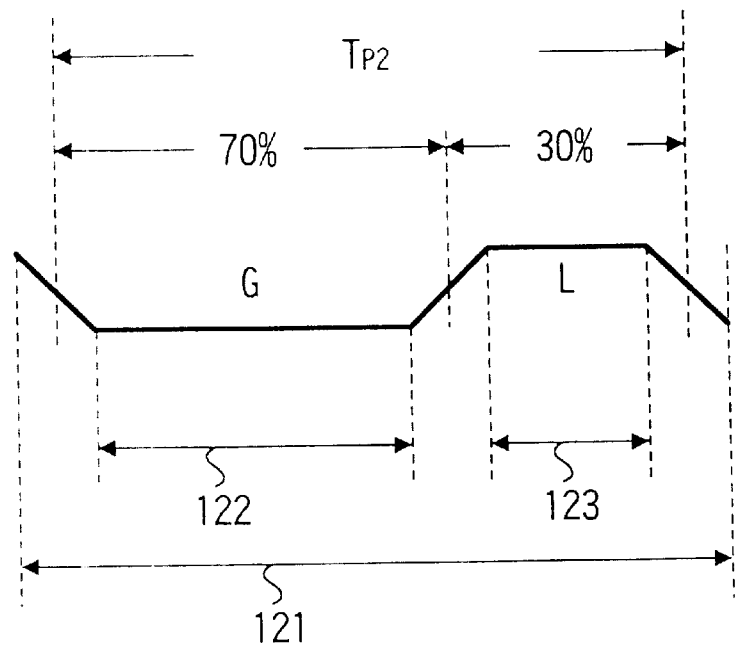
FIG. 14 is a diagram showing another groove recording method according to the present invention.

FIG. 14 shows a land-groove recording method according to another embodiment of the present invention. The foregoing embodiment is associated with the land-groove recording method in which the record mark is formed on both the groove G and the land L. However, in this embodiment to which the present invention is applied, a groove recording system that forms a record mark on the groove G only will be described. In this embodiment, the sum of two respective effective widths of the groove G and the land L is called a track pitch $Tp_2$. In the track pitch $Tp_2$, the groove G is 70% and the land L is 30% in length, respectively. Referring to FIG. 14, even if a beam spot diameter 121 of the laser beam is larger than the track pitch 120, a record portion 122 with the effective width of the groove G is first formed by the recording operation on the groove G. Then, an erased portion 123 is formed by erasing a part of the record portion 122 which sticks out into the land L on the side of the external circumference of the disk due to the formation of the record portion 122. Further, the recording and erasing in this case are performed in the same way as the writing operation and the erasing operation previously described. Also, since the detrack-offset amount of each track is the same as that previously stated, the description thereof is omitted.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An optical recording method of moving an optical pickup over a recording medium to position said optical pickup onto a record target track, and forming a first record mark on the recording medium by a light beam irradiated onto the optical disk from the optical pickup, comprising the steps of:

offsetting an irradiation position of said light beam on said recording medium by a predetermined length relative to said target track in a radial component of a recording direction;

forming a first record mark on said record target track by said offset light beam at a first irradiating power; and erasing a second record mark by said offset light beam at a second irradiating power different from said first irradiating power.

2. An optical recording method according to claim 1, wherein said recording medium comprises a track formed of a spiral groove formed on its recording surface and a land which is sandwiched between groove portions, and wherein in said offsetting step, said first record mark is to be recorded on one of said groove portions, an irradiation position of said light beam is offset by the predetermined distance relative to a track center of said one of said groove portions toward an adjacent land portion in said radial component direction.

3. An optical recording method according to claim 1, wherein said recording medium comprises a track formed of a spiral groove formed on its recording surface and a land which is sandwiched between groove portions, wherein in said offsetting step, when said first record mark is to be newly formed by overwriting on one of said groove portions adjacent to said land portion on which said second record mark is already formed in said radial component direction, an irradiation position of said light beam is offset by the predetermined distance relative to a track center of said one of said groove portions toward said adjacent land portion in said radial component direction, and wherein in said forming step, said first record mark is formed on said one of said groove portions and said land portion adjacent to said one of said groove portions in said radial component direction while said second record mark already formed on said land portion is being erased.

4. An optical recording method according to claim 1, wherein said recording medium comprises a track formed of a spiral groove formed on its recording surface and a land which is sandwiched between groove portions, wherein in said offsetting step, when a record mark is to be formed on one of said groove portions, an irradiation position of said the light beam is offset by the predetermined distance relative to a track center of said one of said groove portions toward an adjacent land portion in said radial component direction, and wherein in said forming step, a recording thin film on said recording medium is heated by said light beam irradiation at said first power for raising its temperature, thereby making an amorphous phase change to be caused in said recording thin film, and said first record mark is formed on said one of said groove portions and said land portion adjacent to said one of said groove portions in said radial component direction.

5. An optical recording method according to claim 1, wherein said recording medium comprises a track formed of a spiral groove formed on its recording surface and a land which is sandwiched between groove portions, wherein in said offsetting step, when first record mark is to be newly formed by overwriting one of said groove portions adjacent to a land portion on which a second record mark is already formed in said radial component direction, an irradiation position of said light beam is offset by the predetermined distance relative to a track center of said one of said groove portions toward said adjacent land portion in said radial component direction, and wherein in said forming step, a recording thin film on said recording medium is heated by said light beam irradiation at said first power for raising its temperature, thereby making an amorphous phase change to be caused in said recording thin film, and said first record mark is formed on said one of said groove portions and said land portion adjacent to said one of said groove portions in said radial component direction while said second record mark already formed on said land portion is being erased.

6. An optical recording method according to any of claims 4 or 5, wherein in said erasing step, a recording thin film on said recording medium is heated by said light beam irradiation at said second power for raising its temperature, thereby causing a crystalline phase change in said recording thin film.

7. An optical recording method according to claim 6, further comprising the steps of:
centering said light beam relative to a read target track on said recording medium; and
reading a third record mark on said read target track by said centered light beam at a third irradiating power different from said first power and said second power.

8. An optical recording method according to claim 7, wherein in said reading step a recording thin film on said recording medium is irradiated by said light beam irradiation at said third power which is insufficient to cause a phase change in said recording thin film.

9. An optical recording method according to claim 6, wherein said temperature of said recording thin film is raised by said light beam irradiating at said second power to between the crystallizing temperature and the melting point of said recording thin film.

10. An optical recording method according to any of claims 4 or 5, wherein said temperature of said recording thin film is raised by said light beam irradiating at said first power to above the melting point of said recording thin film, and is then lowered rapidly.

11. An optical recording method according to claim 10, wherein said temperature is lowered at more than 100 deg/sec.

12. An optical recording method according to claim 1, wherein said recording medium comprises a track formed of a spiral groove formed on its recording surface and a land which is sandwiched between groove portions, wherein in said offsetting step, when a record mark is to be formed on one of said groove portions, an irradiation position of said the light beam is offset by the predetermined distance relative to a track center of said one of said groove portions toward an adjacent land portion in said radial component direction, and wherein in said erasing step, a recording thin film on said recording medium is heated by said light beam irradiation at said second power for raising its temperature, thereby causing a crystalline phase change in said recording thin film.

13. An optical recording method according to any of claims 1 or 12, further comprising the steps of:
centering said light beam relative to a read target track on said recording medium; and
reading a third record mark on said read target track by said centered light beam at a third irradiating power different from said first power and said second power.

14. An optical recording method according to claim 13, wherein in said reading step a recording thin film on said recording medium is irradiated by said light beam irradiation at said third power which is insufficient to cause a phase change in said recording thin film.

15. An optical recording method according to claim 12, wherein said temperature of said recording thin film is raised by said light beam irradiating at said second power to between the crystallizing temperature and the melting point of said recording thin film.

16. An optical recording method according to claim 1, wherein said recording medium comprises a track formed of a spiral groove formed on its recording surface and a land which is sandwiched between groove portions, and wherein in said offsetting step, said first record mark is to be recorded on a land portion, an irradiation position of said light beam is offset by the predetermined distance relative to a track center of said land portion toward an adjacent groove portion in said radial component direction.

17. An optical recording method according to claim 1, wherein said recording medium comprises a track formed of a spiral groove formed on its recording surface and a land which is sandwiched between groove portions, wherein in said offsetting step, when said first record mark is to be newly formed by overwriting on a land portion adjacent to said groove portion on which said second record mark is already formed in said radial component direction, an irradiation position of said light beam is offset by the predetermined distance relative to a track center of said land portion toward said adjacent groove portion in said radial component direction, and wherein in said forming step, said first record mark is formed on said land portion and said groove portion adjacent to said land portion in said radial component direction while said second record mark already formed on said groove portion is being erased.

18. An apparatus for recording data on an optical disk having a track formed of a groove and a land which are alternately disposed in a radial direction, comprising:
an optical pickup for irradiating a light beam on a recording surface of said optical disk so that a light spot larger than track width is thereon;
tracking means for controlling a position of said light spot relative to said track;

tracking setting means for controlling said tracking means so that a center of said light spot is located at a position offset by a predetermined amount relative to a track of one of a groove portion and a land portion;

output controlling means for forming a first record mark on the recording surface of said optical disk by controlling said light beam to be a first power; and for erasing a second record mark by controlling said light beam to be a second power different from said first power.

19. An apparatus according to claim 18, wherein said tracking setting means controls said tracking means so that a circumference portion of said light spot is located substantially at an edge portion, on an opposite side in a radial component of a recording direction, of a track where data is to be recorded.

20. An apparatus according to claim 18, wherein said tracking means carries out respective tracking operations depending upon whether a track where said light beam is irradiated is a groove portion or a land portion, and said tracking setting means supplies a signal having either of polarities which are different from each other depending upon whether a track where said light beam is irradiated is a groove portion or a land portion, as a tracking setting value to said tracking means.

21. An apparatus according to claim 18, wherein when a third record mark formed on said track is read, said tracking setting means controls said tracking means so that a spot of said light spot is located at a track center.

22. An apparatus according to claim 21, wherein said output controlling means controls said light beam to be said third power so that a temperature of said recording surface is heated by said light beam at a third power different from said first power and said second power.

23. An apparatus according to claim 21, wherein said third power is insufficient to cause a phase change in said recording layer when said third record mark is read.

24. An apparatus according to claim 18, wherein said output controlling means, when a record mark is formed on either of said groove portion and said land portion, erases a part of said record mark formed on the other of said groove portion and said land portion adjacent thereto in a radial component of a recording direction, and simultaneously forms a new record mark on the other of said groove portion and land portion.

25. An apparatus according to claim 24, wherein a phase-change recording film is formed on the recording surface of said optical disk.

26. An apparatus according to claim 18, wherein said output controlling means controls said light beam to be said first power so that a temperature of said recording surface is heated by said light beam at said first power for raising its temperature and causing an amorphous phase change in said recording surface to produce said first record mark.

27. An apparatus according to claim 26, wherein said output controlling means controls said light beam to be said third power so that said temperature of said recording thin film is raised by said light beam irradiating at said first power to above the melting point of said recording thin film, and then so that said temperature is lowered rapidly.

28. An apparatus according to claim 27, wherein said controller lowers said temperature at more than 100 deg/sec.

29. An apparatus according to any of claims 18 or 26, wherein said output controlling means controls said light beam to be said second power so that a temperature of said recording surface is heated by said light beam at said second power for raising its temperature and causing a crystalline phase change in said recording surface to erase said second record mark.

30. An apparatus according to claim 29, wherein output controlling means controls said light beam to be said second power so that said temperature of said recording surface is raised by said light beam irradiating at said second power to between the crystallizing temperature and the melting point of said recording surface.

31. An apparatus for recording data on an optical disk having a track formed of a groove and a land which are alternately disposed in the radial direction, comprising:

an optical pickup for irradiating a light beam on a recording surface of said optical disk so that a light spot larger than track width is formed thereon;

a servo for controlling a position of said light spot relative to said track;

a servo circuit for controlling said tracking means so that a center of said light spot is located at a position offset by a predetermined amount relative to a track of one of a groove portion and a land portion; and a controller for forming a first record mark on the recording surface of said optical disk by controlling said light beam to be a first power; and for erasing a second record mark by controlling said light beam to be a second power different from said first power.

32. An apparatus according to claim 31, wherein said servo circuit controls said servo so that a circumference portion of said light spot is located substantially at an edge portion, on an opposite side in a radial component of a recording direction, of a track where data is to be recorded.

33. An apparatus according to claim 31, wherein said servo carries out respective tracking operations depending upon whether a track where said light beam is irradiated is a groove portion or a land portion, and said servo circuit supplies a signal having either of polarities which are different from each other depending upon whether a track where said light beam is irradiated is a groove portion or a land portion, as a tracking setting value to said servo.

34. An apparatus according to claim 31, wherein when a third record mark formed on said track is read, said servo circuit controls said servo so that a spot of said light spot should be located at a track center.

35. An apparatus according to claim 31, wherein said controller, when said first record mark is formed on either of said groove and said land, erases a part of said second record mark formed on the other of said groove and said land adjacent thereto in a radial component of a recording direction, and simultaneously forms said first record mark.

36. An apparatus according to claim 35, wherein a phase-change recording film is formed on the recording surface of said optical disk.

37. An apparatus according to claim 31, wherein said controller controls said light beam to be said first power so that a temperature of said recording surface is heated by said light beam at said first power for raising its temperature and causing an amorphous phase change in said recording surface to produce said first record mark.

38. An apparatus according to claim 37, wherein said controller controls said light beam to be said first power so that said temperature of said recording thin film is raised by said light beam irradiating at said third power to above the melting point of said recording thin film, and then so that said temperature is lowered rapidly.

39. An apparatus according to claim 38, wherein said controller lowers said temperature at more than 100 deg/sec.

40. An apparatus according to any of claims 31 or 35, wherein said controller controls said light beam to be said second power so that a temperature of said recording surface is heated by said light beam at said second power for raising its temperature and causing a crystalline phase change in said recording surface to erase said second record mark.

41. An apparatus according to claim 40, wherein controller controls said light beam to be said second power so that said temperature of said recording surface is raised by said light beam irradiating at said second power to between the crystallizing temperature and the melting point of said recording surface.

42. An apparatus according to claim 34, wherein said output controlling means controls said light beam to be said third power so that a temperature of said recording surface is heated by said light beam at a third power different from said first power and said second power.

43. An apparatus according to claim 42, wherein said third power is insufficient to cause a phase change in said recording layer when said third record mark is read.

* * * * *